United States Patent
Bryan et al.

(10) Patent No.: US 7,164,818 B2
(45) Date of Patent: Jan. 16, 2007

(54) INTEGRATED GRADIENT INDEX LENSES

(75) Inventors: Michael A. Bryan, Oakland, CA (US); Elizabeth Anne Nevis, Sunnyvale, CA (US)

(73) Assignee: NeoPhontonics Corporation, San Jose, CA (US)

( * ) Notice: Subject to any disclaimer, the term of this patent is extended or adjusted under 35 U.S.C. 154(b) by 0 days.

(21) Appl. No.: 10/138,754

(22) Filed: May 3, 2002

(65) Prior Publication Data

US 2002/0164119 A1 Nov. 7, 2002

Related U.S. Application Data

(60) Provisional application No. 60/288,533, filed on May 3, 2001.

(51) Int. Cl.
G02B 6/32 (2006.01)

(52) U.S. Cl. ............................ 385/33; 385/14; 385/34; 385/50

(58) Field of Classification Search .................. 385/14, 385/27, 31, 33, 39, 129, 130, 34, 49, 50; 65/386, 387; 359/652–654
See application file for complete search history.

(56) References Cited

U.S. PATENT DOCUMENTS

| | | | | |
|---|---|---|---|---|
| 3,941,474 A | | 3/1976 | Kitano et al. ........... 350/96 GN |
| 4,418,980 A | * | 12/1983 | Keil et al. ...................... 385/1 |
| 4,805,997 A | * | 2/1989 | Asahara et al. ............. 359/652 |
| 4,878,728 A | * | 11/1989 | Mannschke ................... 385/14 |
| 5,224,184 A | * | 6/1993 | Boudreau ..................... 385/35 |
| 5,719,973 A | | 2/1998 | Monroe et al. ............... 385/34 |
| 5,757,993 A | * | 5/1998 | Abe .............................. 385/34 |
| 5,790,314 A | | 8/1998 | Duck et al. ................. 359/654 |
| 5,845,023 A | | 12/1998 | Lee ............................. 385/33 |
| 5,958,348 A | | 9/1999 | Bi et al. ................. 422/186.04 |
| 5,995,294 A | * | 11/1999 | West ........................... 359/642 |
| 5,999,672 A | * | 12/1999 | Hunter et al. .................. 385/37 |
| 6,172,817 B1 | | 1/2001 | Senapati et al. ............ 359/654 |
| 6,181,722 B1 | | 1/2001 | Dütting et al. ................ 372/45 |
| 6,193,936 B1 | | 2/2001 | Gardner et al. ............. 422/186 |
| 6,307,995 B1 | | 10/2001 | Veligdan ..................... 385/129 |
| 6,339,662 B1 | | 1/2002 | Koteles et al. ................ 385/24 |
| 6,404,954 B1 | * | 6/2002 | Zhu et al. ..................... 385/34 |
| 6,407,852 B1 | * | 6/2002 | Lange et al. ................ 359/333 |

(Continued)

FOREIGN PATENT DOCUMENTS

WO    WO 01/007155    2/2001

(Continued)

OTHER PUBLICATIONS

Bi et al., "Three Dimensional Engineering of Planar Optical Structures," U.S. Appl. No. 10/027,906, filed Dec. 21, 2002, 131 pages (application & drawings as filed).

Primary Examiner—Sung Pak
Assistant Examiner—Daniel Petkovsek
(74) Attorney, Agent, or Firm—Dard & Associates, PLLC; Peter S. Dardi

(57) ABSTRACT

Gradient index lenses are described that are integrated within a planar optical structure. The gradient index lens is optically coupled to a planar optical waveguide. In some embodiments, the gradient index lens with variation in index-of-refraction in one dimension is within an optical fiber. The optical fiber includes cladding at least along the edges of the central plane of the gradient index lens. Methods for forming the integrated structures are described. Further optical structures involving the gradient index lenses are also described.

34 Claims, 12 Drawing Sheets

U.S. PATENT DOCUMENTS

| | | | |
|---|---|---|---|
| 6,438,291 B1 * | 8/2002 | Duck et al. | 385/34 |
| 6,542,665 B1 * | 4/2003 | Reed et al. | 385/34 |
| 6,594,420 B1 * | 7/2003 | Lange et al. | 385/36 |
| 6,643,428 B1 * | 11/2003 | Chang | 385/33 |
| 6,802,190 B1 * | 10/2004 | Reed et al. | 65/377 |
| 6,847,770 B1 * | 1/2005 | Kittaka et al. | 385/124 |

FOREIGN PATENT DOCUMENTS

| | | |
|---|---|---|
| WO | WO 02/32588 | 4/2002 |
| WO | WO 02/44765 | 6/2002 |

* cited by examiner

P=0.25

P=0.5

P=0.75

P=1.0

INTEGRATED GRADIENT INDEX LENSES

CROSS REFERENCE TO RELATED APPLICATIONS

This application claims priority to copending U.S. Provisional Patent Application Ser. No. 60/288,533 filed on May 3, 2001 to Bryan, entitled "Optical Material With Selected Index Of Refraction," incorporated herein by reference.

FIELD OF THE INVENTION

The invention relates to optical structures that incorporate gradient index lenses, in which the optical structures are generally planar optical structures, optical fiber preforms or optical fibers. In some embodiments, the gradient index lenses have a index-of-refraction that varies in one dimension. The invention further relates to light reactive deposition for the formation of planar optical structures and optical fiber preforms with gradient index lenses.

BACKGROUND OF THE INVENTION

Presently used optical communication light wavelengths are from 1.3 to 1.6 microns. Optical waveguides, in fiber or planar form, generally have dimensions many times the wavelength. Thus, optical structures under typical present configurations can have dimensions from a few microns to about 100 microns depending on optical mode requirements and other factors. Optical transmission generally is based on transmission through a higher index-of-refraction material in a core that is surrounded by a lower index-of-refraction material called the cladding. Light is confined within the core material in appropriate geometries by total internal reflection at the dielectric interface for light propagating through the core. Long range optical communications generally are carried on optical fibers. However, manipulation of the optical signals involves optical devices that connect with the optical fibers. Planar structures can present optical devices in a more compact format.

An explosion of communication and information technologies comprising Internet based systems has motivated a worldwide effort to implement optical communication networks to take advantage of a large bandwidth available with optical communication. The capacity of optical fiber technology can be expanded further with implementation of Wavelength Division Multiplexing technology. With increasing demands, more channels are needed to fulfill the system functions.

Basic characteristics of optical materials comprise surface quality, uniformity and optical quality. Optical quality refers to small enough absorption and scattering loss to achieve desired levels of transmission. Optical quality also comprises the uniformity of optical properties, such as index-of-refraction, and bi-refringence properties. In addition, optical quality is affected by interface quality, such as the interface between the core layers and cladding layers. For silica ($SiO_2$) and several other materials, preferred forms for optical transmission are a glass, while for some other materials single crystal or polycrystalline forms may have the highest quality optical transmission.

Several approaches have been used and/or suggested for the deposition of the optical materials. These approaches comprise, for example, flame hydrolysis deposition, chemical vapor deposition, physical vapor deposition, sol-gel chemical deposition and ion implantation. Flame hydrolysis deposition involves the use of a hydrogen-oxygen flame to react gaseous precursors to form particles of the optical material as a coating on the surface of the substrate. Subsequent heat treatment of the coating can result in the formation of a uniform optical material, which generally is a glass material. Flame hydrolysis and forms of chemical vapor deposition have been successful in the production of glass for use as fiber optic elements and planar waveguides.

SUMMARY OF THE INVENTION

In a first aspect, the invention pertains to a planar optical structure comprising a first planar optical waveguide and a first planar gradient index lens optically coupled to the planar optical waveguide.

In another aspect, the invention pertains to an optical fiber comprising a first gradient index lens and a cladding. The first gradient index lens has an index-of-refraction varying in a single dimension relative to a central plane along a first axis, and the cladding is located at least along the edges of the central plane. The cladding has an index-of-refraction lower than the gradient index lens along the central plane.

In a further aspect, the invention pertains to a method for forming a planar optical structure. The method comprises forming a core layer of a planar optical waveguide in optical communication with a planar gradient index lens.

In additional embodiments, the invention pertains to an optical structure comprising a first optical core, a second optical core, a gradient index lens and a free space optical element. The first optical core, the second optical core and gradient index lens are within a monolithic optical structure, and the free space optical element is within a cut out in the monolithic optical structure. The gradient index lens optically connects the first optical structure, and the free space optical element optically connects the first optical core and the second optical core.

DETAILED DESCRIPTION OF THE INVENTION

Figure 1:
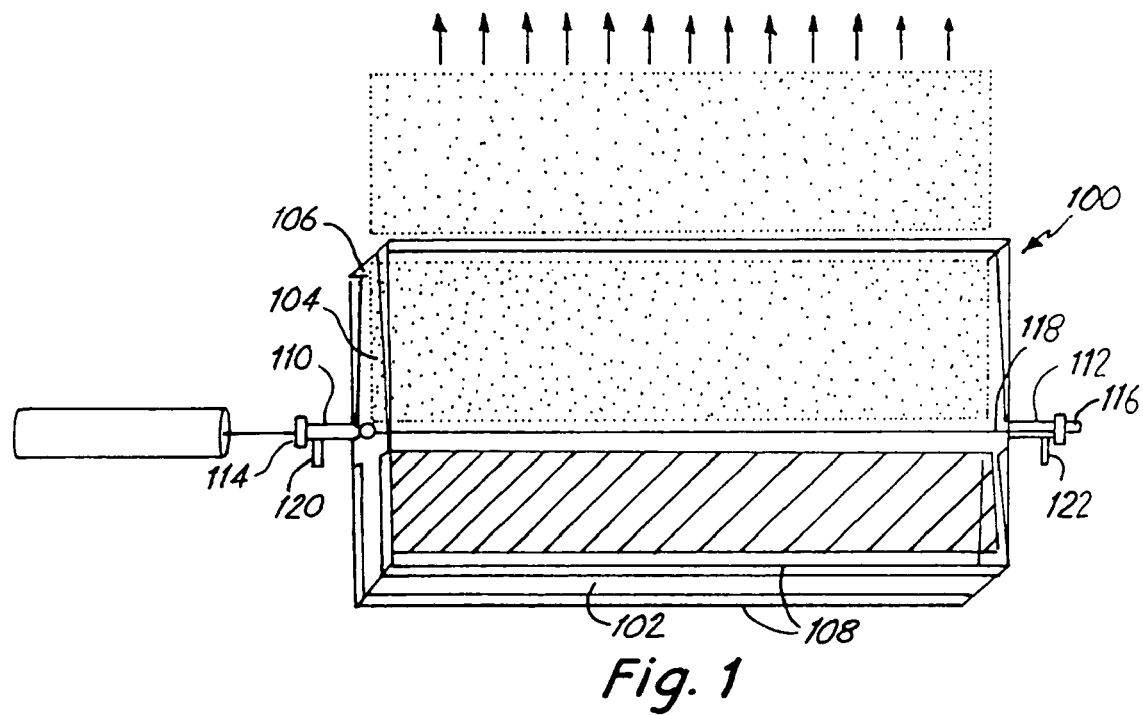
FIG. 1 is a side perspective view of a reaction chamber for performing laser pyrolysis synthesis of powders at high production rates.

Gradient index lenses provide a versatile approach for the focusing of light within an integrated optical structure, which can be, for example, a planar optical structure and/or an optical fiber. Gradient index lenses involve variation in index-of-refraction at an angel to the propagation direction of the light. Traditional gradient index lenses involve radial variation in index-of-refraction according to a particular formula, which can result in the focusing of light comparable to a concave lens. In addition, a comparable variation along one dimension can result in focusing of light along one dimension, e.g., comparable to a cylindrical lens. Gradient index lenses offer distinct advantages over lenses formed with curved surfaces with respect to integration of optical devices. Specifically, gradient index lenses can be directly integrated into an optical structure during the formation of the optical structure. Thus, there are no complications regarding placement, and alignment of the lens and the interface formed at the lens surface. Gradient index lenses can be formed within planar optical structures and optical fiber preforms, for example, by light reactive deposition.

Fiber optic communication networks provide broadband communication channels. However, manipulation of the optical signals requires the interface of the fiber optical pathways with appropriate optical devices and electro-optical devices. The connection between different optical elements can present significant challenges, and the ability to focus with within an integrated structure can facilitate the connection of different elements. The formation of planar optical devices on a substrate surface has been used to decrease the size of the optical devices. The formation of planar optical devices involves the manipulation of optical materials to form structures in layers with dimension on the order of a micron to tens or hundreds of microns. Improved processes for the deposition of optical materials and/or the manipulation of optical materials in the formation of optical devices introduces the capability of producing more complex optical devices and integrated structures in more compact configurations.

While the discussion herein focuses on planar optical devices, some of the embodiments relate to optical fibers and optical fiber preforms. Optical fibers are generally formed by pulling the optical fiber from a softened preform that introduces the basic structural and compositional aspects of the fiber. Optical fiber preforms can be produced using similar approaches for the formation of planar optical devices.

Central to the formation of optical devices is the variation of the optical properties at different physical locations. For example, variation in index-of-refraction generally is used to confine light along a particular path or waveguide. Optical properties can be varied with changes in chemical composition and/or in physical properties, such as density.

A gradient index lens can have a radial gradient in index-of-refraction. Specifically, the index-of-refraction is largest in the center of the lens and decreases with distance radially from an axis passing through the center. Light propagates through the lens with a propagation component along the central axis of the lens. In some embodiments, the distribution of index-of-refraction of an ideal gradient index lens as a function of radial distance r from the central axis can be given as $N(r)=N_0(1-Ar^2/2)$, where A is the radial constant. No is the maximum index-of-refraction of the lens at the center r=0. As described by this equation, the index-of-refraction decreases quadratically as a function of radial distance. Of course, actual gradient index lenses only approximate this distribution. An actual distribution approximating this quadratic distribution can be continuous or a step wise discontinuous change.

In contrast, with conventional gradient index lenses, alternative gradient index lenses have a gradient in index-of-refraction in only a single dimension. Thus, these one-dimensional gradient index lenses only refract light in a single dimension. Since they only refract light in a single dimension, these 1-D gradient index lenses function analogously to a cylindrical lens. The optical material in these one-dimensional gradient index lenses have an index of refraction that varies with distance from a plane rather than as a radial distance. With an index-of-refraction that only varies in a single dimension, a distance "d" from a central plane replaces the radial distance in the functional dependence. For a gradient index lens that approximates a cylindrical lens, e.g., a concave cylindrical lens, the equation describing the index-of-refraction is $N(d)=N_0(1-B\ d^2/2)$, where B is the corresponding constant related to the variation in index with distance from the central plane of the lens. As with the traditional two-dimensional gradient index lenses, actual one-dimensional gradient index lenses can vary from the ideal described by the equation.

While the quadratic variation with distance for the two-dimensional and one-dimensional gradient index lenses provides an optical performance corresponding, respectively, to concave and cylindrical lenses, other functional variations in index-of-refraction as a function of radial distance or distance from the central plane can be used to achieve other optical properties. The optical effect of other functional variations in index-of-refraction can be determined from standard optical principles. A person of ordinary skill in the art can therefore select a variation in index of refraction to accomplish desired optical properties.

In some embodiments, the gradient index lenses are integrated into an optical structure in which the gradient index lens is in optical communication with other devices of the optical structure. The optical structure can be for example, a planar optical structure or an optical fiber. Generally, for these integrated embodiments, the gradient index lens can form a core that is surrounded by a cladding optical material with a lower index-of-refraction than the core, although the natural drop in index-of-refraction due to the index gradient can obviate the need for a separate cladding. In some embodiments, a separate cladding may be included only around selected portions of the gradient index lens. For example, for embodiments in which the gradient varies in one dimension, the cladding can be places along edges perpendicular to the central plane of the gradient index lens.

Optical devices generally are formed to included confined optical pathways or waveguides that direct light. Optical circuits can include one or more optical devices that manipulate the light generally with passive waveguides directing the light within the circuit, such as to and from the optical devices. Optical waveguides and many optical devices include a core of material confined within a cladding. The core has a higher index-of-refraction than the surrounding cladding such that light is confined in the core by total internal reflection. In addition, for particular wavelengths of light, the difference in index-of-refraction between the core and cladding is selected to be within a particular range to confine the light while limiting the light to a single mode of transmission. Since planar optical materials are generally organized in layers, the cladding surrounding a particular waveguide/optical device can generally be considered as including an under-cladding in a layer below the core, an over-cladding in a layer above the core and cladding patterned within the same layer as the core to fill in the core layer around the core and other optical or non-optical devices within the layer. The cladding in the core layer may or may not be deposited during the formation of the over-cladding layer.

Efficient approaches have been developed for the patterning of optical compositions for the formation of optical materials, as described in detail below. For example, in the formation of a core layer, and optionally in the formation of cladding layers, the composition of the optical material can be varied to change the index-of-refraction and/or the other optical properties, for example, in the formation of active optical devices. These approaches can be adapted for the formation planar integrated gradient index lenses and/or optical fiber preforms comprising integrated gradient index lenses that can be pulled to form corresponding optical fibers.

A new process has been developed involving reactive deposition driven by a radiation beam (e.g., a light beam), to form coatings with optical characteristics that are tightly controlled. The coating can be used to form optical structures with simple or complex collections of corresponding optical devices. In one embodiment, reactive deposition driven by a radiation beam (e.g., a light beam) involves a reactor with a flowing reactant stream that intersects a radiation beam proximate a reaction zone to form a product stream configured for the deposition of product particles onto a surface following formation of the particles in the flow. The particles are deposited in the form of a powder array, i.e. a collection of unfused particles or a network of fused or partly fused particles in which at least some characteristics of the initial primary particles are reflected within the array. Radiation-based reactive deposition incorporates features of a radiation-based process for driving the reaction of a flowing reactant stream to form submicron powders into a direct coating process. When particle formation incorporates an intense light beam as the radiation source for the harvesting of particles, the radiation-based process for the production of submicron powders in a flow is known as laser pyrolysis. In particular, a wide range of reaction precursors can be used to generate a reactant stream with compositions in gas, vapor and/or aerosol form, and a wide range of highly uniform product particles can be efficiently produced. Reactant delivery approaches developed for laser pyrolysis can be adapted for radiation-based reactive deposition. For convenience, this application refers to radiation-based pyrolysis and laser pyrolysis interchangeably and to radiation-based reactive deposition and light reactive deposition interchangeably.

In laser pyrolysis, the reactant stream is reacted by an intense light beam, such as a laser beam, which heats the reactants at a very rapid rate. While a laser beam is a convenient energy source, other intense radiation (e.g., light) sources can be used in laser pyrolysis. Laser pyrolysis provides for formation of phases of materials that are difficult to form under thermodynamic equilibrium conditions. As the reactant stream leaves the light beam, the product particles are rapidly quenched. The reaction takes place in a confined reaction zone at the intersection of the light beam and the reactant stream. For the production of doped materials and other complex optical materials, the present approaches have the advantage that the composition of the materials can be adjusted over desirable ranges.

Submicron inorganic particles with various stoichiometries, non-stoichiometric compositions and crystal structures, including, for example, amorphous structures, have been produced by laser pyrolysis, alone or with additional processing, such as heat treatment. Specifically, amorphous and crystalline submicron and nanoscale particles can be produced with complex compositions using laser pyrolysis. Light reactive deposition can be used to form highly uniform coatings of glasses, i.e., amorphous materials, and crystalline materials (either single crystalline or polycrystalline), optionally with dopants comprising, for example, complex blends of stoichiometric and/or dopant components. Suitable optical materials include, for example, silicon oxide, germanium oxide, aluminum oxide, titanium oxide, telluride glasses, phosphate ($P_2O_5$) glass, InP, lithium niobate, combinations thereof and doped compositions thereof. Glasses have been generally used in optical applications, although crystalline aluminum oxide, e.g., sapphire, and crystalline $SiO_2$, e.g., quartz, may be suitable for optical applications at certain light wavelengths.

A basic feature of successful application of laser pyrolysis/light reactive deposition for the production of particles and corresponding coatings with desired compositions is generation of a reactant stream containing an appropriate precursor composition. In particular, for the formation of doped materials by light reactive deposition, the reactant stream can comprise host glass or crystal precursors and, optionally, dopant precursors. The reactant stream includes appropriate relative amounts of precursor compositions to produce the optical materials with the desired stoichiometries and dopant compositions. Also, unless the precursors are an appropriate radiation absorber, an additional radiation absorber is added to the reactant stream to absorb radiation/light energy for transfer to other compounds in the reactant stream. Other additional reactants can be used to adjust the oxidizing/reducing environment in the reactant stream. Formation of doped optical glasses with these reactive approaches can involve fewer processing steps than common commercial approaches for introducing dopants.

By adapting the properties of laser pyrolysis, light reactive deposition is able to deposit highly uniform, very small particles in a coating. Due to the uniformity and small size of the powders, light reactive deposition can be used to form uniform and smooth coating surfaces. The desirable qualities of the particles are a result of driving the reaction with an intense light beam, which results in the extremely rapid heating and cooling. Using light reactive deposition, silicon oxide glass coatings following heating have been formed that have a root mean square surface roughness, as measured by atomic force microscopy, of about 0.25 to about 0.5 nm. Thus, the surfaces are smoother than are thought to be obtained by flame hydrolysis deposition and roughly comparable to smoothness obtainable by chemical vapor deposition. The smooth glass coating applied by light reactive deposition was deposited at relatively high deposition rates by moving the substrate through the product stream.

Light reactive deposition is able to produce quality coatings at much higher rates than previously available. At the same time, light reactive deposition is able to generate coatings with an extremely broad range of compositions by controlling reactant composition, reaction chemistry and reaction conditions, such as light intensity which can be used to continuously control effective temperatures in the reaction zone over a wide range, such as in the range(s) from about room temperature (e.g., 20° C.) to about 3000° C. Thus, light reactive deposition has already demonstrated the ability to be an efficient and effective approach for the formation of very high quality glass coatings.

Multiple layers can be formed by additional sweeps of the substrate through the product particle stream. Since each coating layer has high uniformity and smoothness, a large number of layers can be stacked while maintaining appropriate control on the layered structure such that optical devices can be formed throughout the layered structure without structural variation adversely affecting the ability to form optical devices. Composition can be varied between layers, i.e., perpendicular to the plane of the structure, and/or portions of layers, within the plane of the structure, to form desired optical structures. Thus, using light reactive deposition possibly with other patterning approaches, it is possible to form complex structures with intricate variation of materials with selectively varying compositions. Furthermore, by adapting laser pyrolysis techniques for the production of commercial quantities of powders, light reactive deposition can form high quality coatings at very rapid rates.

To form a uniform optical layer, a layer of amorphous particles deposited by light reactive deposition can be consolidated/densified. To consolidate the optical materials, the powders are heated to a temperature above their flow temperature. At these temperatures, the powders density and upon cooling form a uniform layer of optical material. Substantially uniform optical materials have an optical quality that permits transmission of light. Incorporation of desired composition and/or dopants into the particles results in an optical material with a desired composition/dopants through the resulting densified optical material directly as a result of the powder deposition. Generally, amorphous particles can be consolidated to form a glass material, and crystalline particles, such as aluminum oxide, can be consolidated to form a crystalline material, such as sapphire. However, in some embodiments, appropriate heating and quenching rates can be used to consolidate an amorphous material into a crystalline layer, either single crystalline or polycrystalline, (generally slow quenching rates) and a crystalline powder into a glass layer (generally a rapid quench).

Passive and/or active optical devices can be incorporated into the optical structure to introduce the desired functionality. Optical devices of interest comprise, for example, optical waveguide devices, such as optical couplers, splitters, arrayed waveguide grating (AWG) and the like. Waveguides manufactured on a substrate surface are referred to as planar waveguides. Planar waveguides are useful in the production of integrated optical circuits for optical communication and other opto-electronics applications. Other optical devices of interest comprise, for example, three dimensional optical memory device, Bragg grating, optical attenuator, optical splitter/coupler, optical filter, optical switch, laser, modulator, interconnect, optical isolator, optical add-drop multiplexer (OADM), optical amplifier, optical polarizer, optical circulator, phase shifter, optical mirror/reflector, optical phase-retarder, and optical detector.

Integrated optical circuits generally comprise a plurality of optical devices that are optically connected. In a planar optical structure, a layer of optical material can include one or more optical circuits that form corresponding optical pathways along the layer. Due to improved processing ability of light reactive deposition, multiple layer optical structures with multiple layers having independent light pathways have been described. These multiple layered optical structures are described further in copeuding and commonly assigned PCT application PCT/US01/45762 designating the U.S. filed on Oct. 26, 2001 to Bi et at, entitled "Multilayered Optical Structures," incorporated herein by reference. Furthermore, light reactive deposition can be adapted for full three-dimensional integration of optical structures to take advantage of composition variation in three dimensions. Thus, a monolithic optical structure can be formed with full integration within one or more layers and between layers to form a highly compact optical structure with the capability of complex functionality. The formation of three-dimensional structures is described further in copending and commonly assigned U.S. patent application Ser. No. 10/027,906, now U.S. Pat. No. 6,952,504 to Bi et al., entitled "Three Dimensional Engineering of Optical Structures," incorporated herein by reference. The index-of-refraction selection approaches described herein can be adapted in the formation of complex multilayered optical structures by designing the structures for light pathways to the photosensitive material Cot index-of-refraction selection or by performing the index-of-refraction selection on intermediate structures before all of the layers of the structure are deposited.

The gradient index lenses provide a convenient approach for the formation of integrated optical structures. The use of a gradient index lens provides for convenient integration with a device capable of focusing light without the use of lenses based on curved surfaces. The gradient index lenses can be formed as an integral part of an integrated structure, which can be formed along other optical devices within the optical structure. In contrast with conventional lenses with curved surfaces, gradient index lenses avoid placement, alignment and interface issues if they are formed as integral optical components within a monolithic optical structure. The specific optical properties for the gradient index lens can be selected based on the design of the gradient index lens.

Gradient index lenses (GRIN lenses) offer a convenient alternative to the formation of conventional lenses requiring the polishing of surfaces to obtain desired curvatures. Gradient index lenses can smoothly and continuously redirect light rays toward a point of focus. Simple and compact lens geometries are possible since surface curvatures are not needed for light focusing. Using gradient index lenses, real images can be formed on the surface of a lens. This ability creates unique possibilities for coupling light into an optical fiber or relaying an image through other optical elements. Gradient index lenses are particularly convenient for integrating the lenses into integrated optical circuits either in an optical fiber or a planar optical structure.

In summary, gradient index (GRIN) lenses for integrated optical structures have several significant advantages. First, enablement is ensured since the lens and adjacent optical structures, such as a waveguide, are formed an a monolith single structure. Thus, a separate lens does not have to be aligned mechanically, generally to submicron tolerances in the case of a single-mode waveguide. Less thermal drift is obtained since the lens and the accompanying optical devices, such as a connected waveguide, can be made from very similar materials on a common substrate. The cost generally is reduced since several parts and assembly steps can be eliminated. If the lens allows enlargement of the waveguide at the input or output aperture, the surface quality requirements may be reduced for that edge since a particular defect blocks or scatters a smaller fraction of the light and results in less insertion loss than it would in a smaller aperture.

Particle Deposition

In embodiments of particular interest, the optical layers are formed by light reactive deposition, although the optical materials for the gradient index lens can be deposited by other approaches, such as flame hydrolysis, chemical vapor deposition and physical vapor deposition. In light reactive deposition, highly uniform flow of product particles is formed that are directed toward a substrate to be coated. The resulting particle coating can be formed into an optical material, such as a glass or crystal.

Light reactive deposition/radiation-based reactive deposition is a coating approach that uses an intense radiation source, e.g., light source, to drive synthesis of desired compositions from a flowing reactant stream. Light reactive deposition can result in deposition of powders, although hot particles deposited on the surface can partly fuse during the deposition process due to their temperature. Generally, particles in a product flow, as described herein, can be solid particles, liquid particles and softened particles that have not cooled sufficiently to completely solidify. Light reactive deposition has similarities with laser pyrolysis for powder synthesis in that an intense radiation beam (e.g., a light beam) drives the reaction. Laser pyrolysis involves a flowing reactant stream that intersects with the radiation beam at a reaction zone where reaction products form particles. While the particles produced in laser pyrolysis are collected for subsequent use, in light reactive deposition, the resulting compositions are directed to a substrate surface where a coating is formed. The characteristics of laser pyrolysis that can lead to the production of highly uniform particles can be correspondingly implemented in the production of coatings with high uniformity.

In light reactive deposition, the coating of the substrate can be performed in a coating chamber separate from the reaction chamber or the coating can be performed within the reaction chamber. In either of these configurations, the reactant delivery system can be configured similarly to a reactant delivery system for a laser pyrolysis apparatus for the production of particles with various compositions. Thus, a wide range of coatings can be formed for further processing into optical materials.

If the coating is performed in a coating chamber separate from the reaction chamber, the reaction chamber is essentially the same as the reaction chamber for performing laser pyrolysis, although the reactant throughput and the reactant stream size may be designed to be appropriate for the coating process. For these embodiments, the coating chamber and a conduit connecting the coating chamber with the reaction chamber replace the collection system of the laser pyrolysis system. If the coating is performed within the reaction chamber, a substrate intercepts flow from the reaction zone, directly capturing the particles onto its surface.

A laser pyrolysis apparatus design incorporating an elongated reactant inlet has been developed that facilitates production of commercial quantities of particles. Specifically, the reaction chamber and reactant inlet are elongated significantly along the light beam to provide for an increase in the throughput of reactants and products. By orienting the light beam along the elongated reactant stream, a sheet of product particles is generated. This design has been described in U.S. Pat. No. 5,958,348 to Bi et al., entitled "Efficient Production of Particles by Chemical Reaction," incorporated herein by reference.

Additional embodiments and other appropriate features for commercial capacity laser pyrolysis apparatuses are described in copending and commonly assigned U.S. patent application Ser. No. 09/362,631 to Mosso et al., entitled "Particle Production Apparatus," incorporated herein by reference. The delivery of gaseous/vapor reactants and/or aerosol reactants, as described further below, can be adapted for the elongated reaction chamber design. These designs for commercial production of powders by laser pyrolysis can be adapted for rapid coating of high quality optical materials by light reactive deposition. The size of the elongated reactant inlet can be selected based on the size of the substrate to be coated. In some embodiments, the reactant inlet is somewhat larger than the diameter or other dimension across the substrate, such as a width, such that the entire substrate can be coated in one pass through the product stream. In other embodiments, the substrate is placed far enough away from the reactant inlet that the product particle stream spreads significantly prior to reaching the substrate such that a larger area of the substrate is simultaneously coated.

In general, the particle production apparatus with the elongated reaction chamber and reactant inlet is designed to reduce contamination of the chamber walls, to increase the production capacity and to make efficient use of resources. Due to the chamber design, the elongated reaction chamber can provide for an increased throughput of reactants and products without a corresponding increase in the dead volume of the chamber. The dead volume of the chamber can become contaminated with unreacted compounds and/or reaction products. Furthermore, an appropriate flow of shielding gas can confine the reactants and products within a flow stream through the reaction chamber. The high throughput of reactants makes efficient use of the radiation (e.g., light) energy.

With light reactive deposition, the rate of particle production for rapid coating can vary, for example, in the range(s) from about 1 gram per hour of reaction product to about 10 kilograms per hour of desired reaction product, although clearly lower rates are obtainable if desired. A person of ordinary skill in the art will recognize that additional ranges within the specific ranges are contemplated and are within the present disclosure. Not all of the particles generated are deposited on the substrate. In general, the deposition efficiency depends on several factors including, for example, the relative speed of the substrate through the product stream with the particles, for embodiments based on moving the substrate through a sheet of product particles. Other factors affecting deposition efficiency include, for example, the particle composition, particle temperature and substrate temperature. At moderate relative rates of substrate motion, coating efficiencies of about 15 to about 20 percent have been achieved, i.e. about 15 to about 20 percent of the produced particles are deposited on the substrate surface. Routine optimization can increase this deposition efficiency further. At slower relative motion of the substrate through the product particle stream, deposition efficiencies of at least about 40 percent have been achieved and can be as high as 80 percent or more. A person of ordinary skill in the art will recognize that additional embodiments within the explicit coating efficiencies are contemplated and are within the present disclosure.

Alternatively or in addition, the invention provides that the rate of the movement of the substrate and the particle flow relative to each other can vary substantially, depending on the desired specifications for the coated substrate. Thus, in one embodiment, the rate can be measured on an absolute scale, and can vary in the range(s) of at least about 0.001 inches per second, in other embodiments at least about 0.05 inches per second, in further embodiments, from about 1 inch per second to about 12 inches per second, or even more. A person of ordinary skill in the art will recognize that additional ranges and subranges within these explicit ranges are contemplated and are encompassed within the present disclosure.

For appropriate embodiments using a sheet of product particles, the rate of relative substrate motion generally is a function of the selected deposition rate and the desired coating thickness as limited by the movement the substrate at the desired rate while obtaining desired coating uniformity. In embodiments in which the substrate is swept through the product particle stream, the substrate can be moved relative to a fixed nozzle, or the nozzle can be moved relative to a fixed substrate. Due to the high deposition rates achievable with light reactive deposition, extremely fast coating rates are easily achievable. These coating rates by light reactive deposition are dramatically faster than rates that are achievable by competing methods.

Furthermore, the rapid production rate can be advantageously used to form a plurality of particles coatings with or without consolidation between coatings. Each coating can cover an entire layer or a portion of a layer. Compositions can be changed within a layer or between layers. When changing compositions significantly between layers, it may be desirable to wait a few seconds for the product stream to stabilize.

The design of the elongated reaction chamber 100 for generating a sheet of product particles is shown schematically in FIG. 1. A reactant inlet 102 leads to main chamber 104. Reactant inlet 102 conforms generally to the shape of main chamber 104. Main chamber 104 comprises an outlet 106 along the reactant/product stream for removal of particulate products, any unreacted gases and inert gases. Shielding gas inlets 108 are located on both sides of reactant inlet 102. Shielding gas inlets are used to form a blanket of inert gases on the sides of the reactant stream to inhibit contact between the chamber walls and the reactants or products. The dimensions of elongated reaction chamber 104 and reactant inlet 102 can be designed for highly efficiency particle production. Reasonable dimensions for reactant inlet 102 for the production of nanoparticles, when used with a $CO_2$ laser with a power in the several kilowatt range, are from about 5 mm to about 1 meter.

Tubular sections 110, 112 extend from the main chamber 104. Tubular sections 110, 112 hold windows 114, 116, respectively, to define a light beam path 118 through the reaction chamber 100. Tubular sections 110, 112 can comprise inert gas inlets 120, 122 for the introduction of inert gas into tubular sections 110, 112.

Outlet 106 can lead to a conduit directed to a coating chamber. The reaction zone is located within the reaction chamber. A change in dimension does not necessarily demarcate a transition from the reaction chamber to a conduit to the coating chamber for appropriate embodiments. The conduit can but does not necessarily involve a change in direction of the flow. Alternatively or additionally, a substrate can intercept the product flow to coat the substrate within the reactant chamber.

Figure 2:
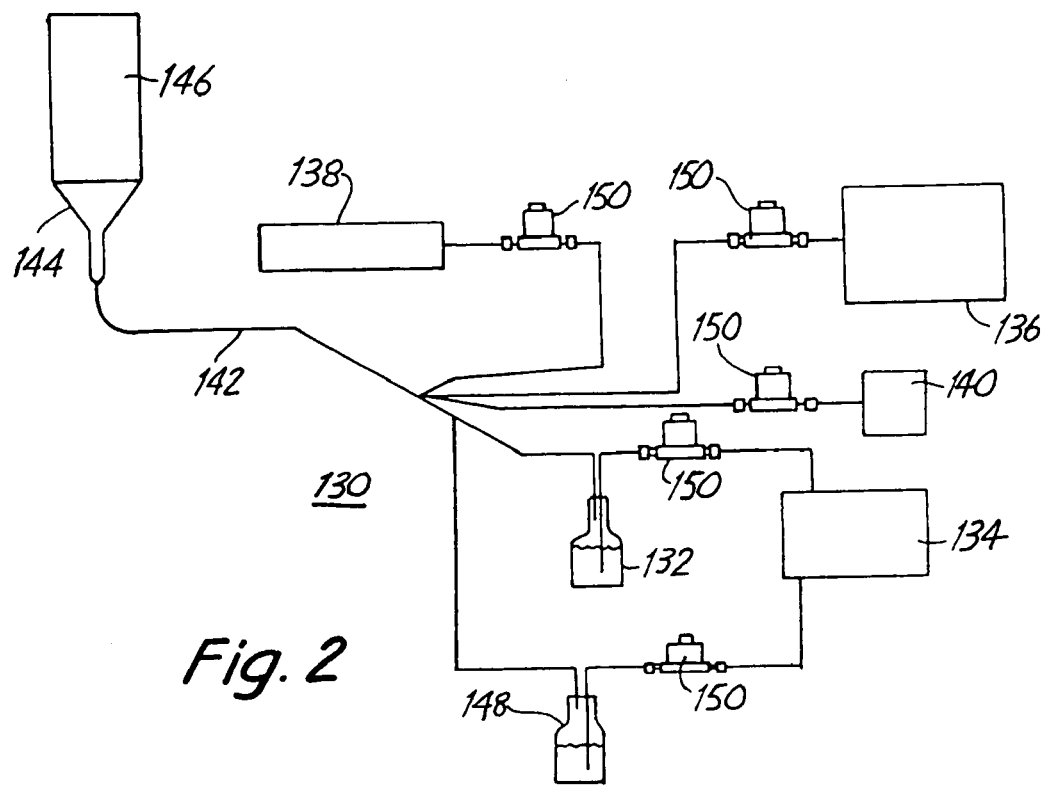
FIG. 2 is a schematic representation of a reactant delivery system for the delivery of vapor/gas reactants to a flowing reaction system, such as the laser pyrolysis reactor of FIG. 1.

Reactant inlet 102 is generally connected to a reactant delivery system. Referring to FIG. 2, an embodiment 130 of a reactant delivery apparatus comprises a source 132 of a precursor compound, which can be a liquid, solid or gas. For liquid or solid reactants, an optional carrier gas from one or more carrier gas sources 134 can be introduced into precursor source 132 to facilitate delivery of the reactant. Precursor source 132 can be a liquid holding container, a solid precursor delivery apparatus or other suitable container. The carrier gas from carrier gas source 134 can be, for example, an infrared absorber, an inert gas or mixtures thereof. In alternative embodiments, precursor source 132 is a flash evaporator that can deliver a selected vapor pressure of precursor without necessarily using a carrier gas.

The gases/vapors from precursor source 132 can be mixed with gases from infrared absorber source 136, inert gas source 138 and/or gaseous reactant source 140 by combining the gases/vapors in a single portion of tubing 142. The gases/vapors are combined a sufficient distance from the reaction chamber such that the gases/vapors become well mixed prior to their entrance into the reaction chamber. The combined gas/vapor in tube 142 passes through a duct 144 into channel 146, which is in fluid communication with a reactant inlet, such as 102 in FIG. 1.

An additional reactant precursor can be supplied as a vapor/gas from second reactant source 148, which can be a liquid reactant delivery apparatus, a solid reactant delivery apparatus, a flash evaporator, a gas cylinder or other suitable container or containers. As shown in FIG. 2, second reactant source 148 delivers an additional reactant to duct 144 by way of tube 142. Alternatively, second reactant source can deliver the second reactant into a second duct such that the two reactants are delivered separately into the reaction chamber where the reactants combine at or near the reaction zone. Thus, for the formation of complex materials and/or doped materials, a significant number of reactant sources and, optionally, separate reactant ducts can be used for reactant/precursor delivery. For example, as many as 25 reactant sources and/or ducts are contemplated, although in principle, even larger numbers could be used. Mass flow controllers 150 can be used to regulate the flow of gases/vapors within the reactant delivery system of FIG. 2. Additional reactants/precursors can be provided similarly for the synthesis of complex materials.

As noted above, the reactant stream can comprise one or more aerosols. The aerosols can be formed within the reaction chamber or outside of the reaction chamber prior to injection into the reaction chamber. If the aerosols are produced prior to injection into the reaction chamber, the aerosols can be introduced through reactant inlets comparable to those used for gaseous reactants, such as reactant inlet 102 in FIG. 1. For the formation of complex material, additional aerosol generators and/or vapor/gas sources can be combined to supply the desired composition within the reactant stream.

Figure 3:
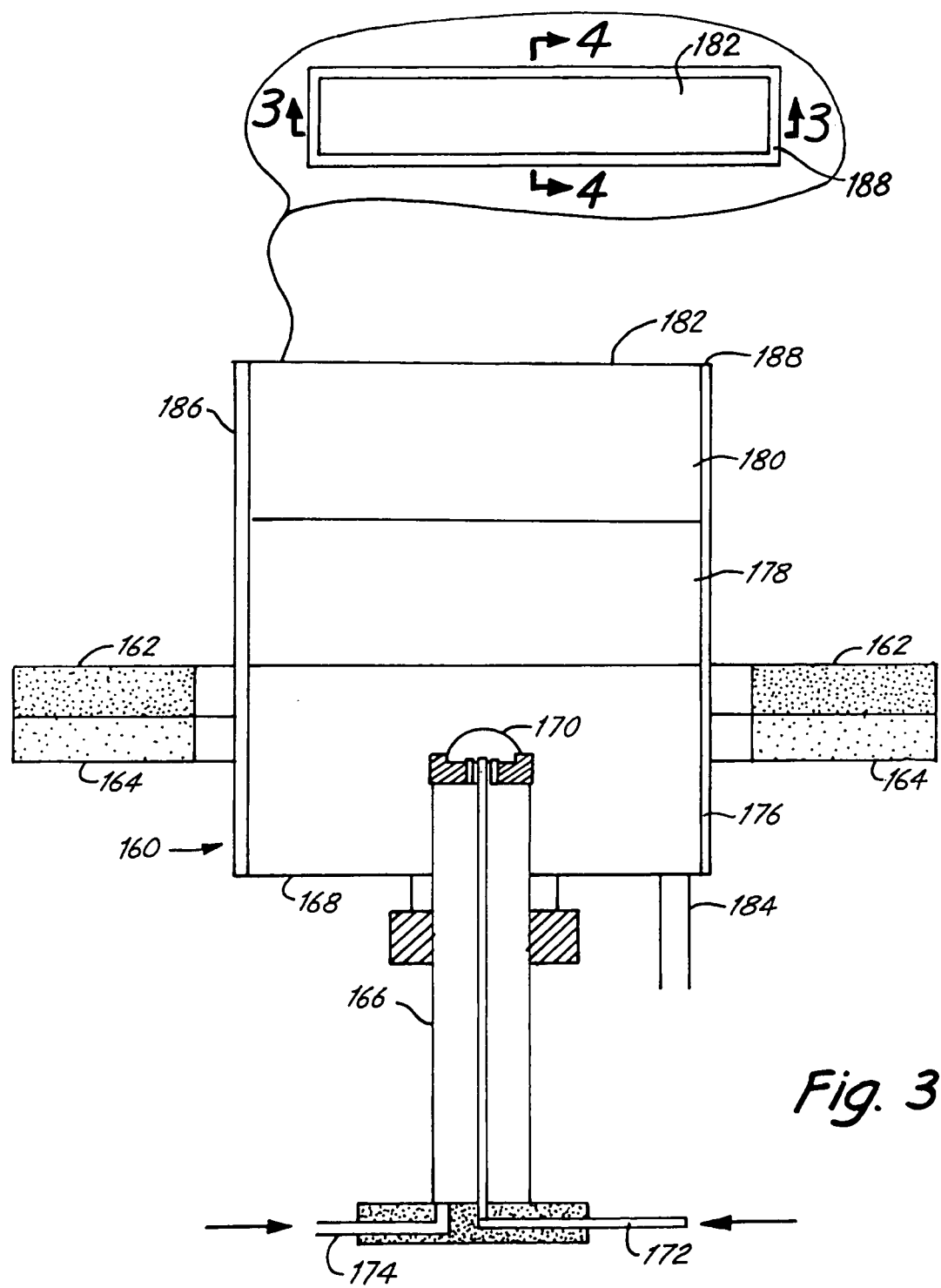
FIG. 3 is a sectional side view of a reactant inlet nozzle with an aerosol generator for the delivery of aerosol and gas/vapor compositions into a reaction chamber, wherein the cross section is taken along line 3—3 of the insert. The insert shows a top view of an elongated reactant inlet.
Figure 4:
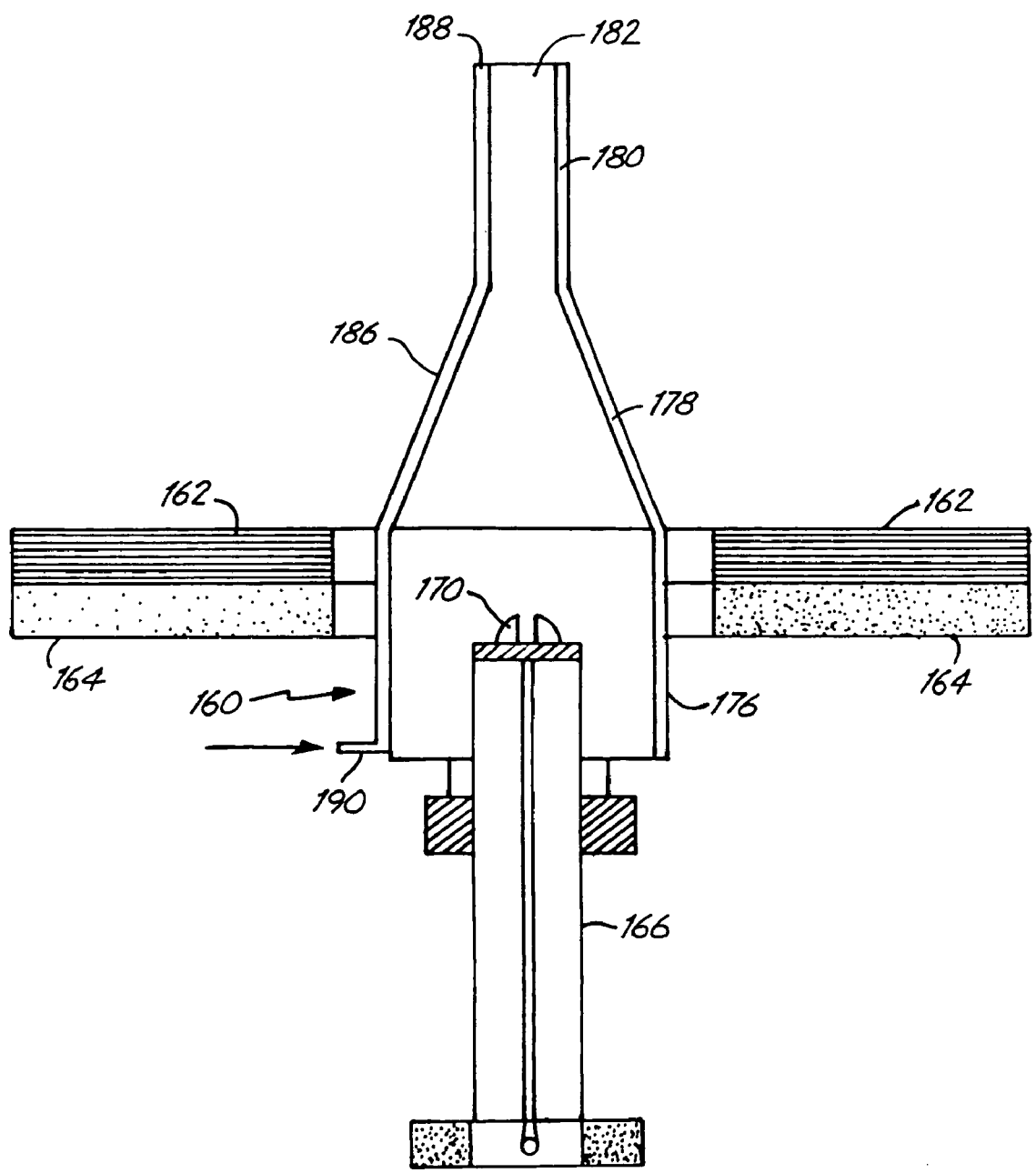
FIG. 4 is a sectional side view of the reactant inlet nozzle of FIG. 3 taken along the line 4—4 of the insert in FIG. 3.

An embodiment of a reactant delivery nozzle configured to deliver an aerosol reactant is shown in FIGS. 3 and 4. Inlet nozzle 160 connects with a reaction chamber at its lower surface 162. Inlet nozzle 160 comprises a plate 164 that bolts into lower surface 162 to secure inlet nozzle 160 to the reaction chamber. Inlet nozzle 160 comprises an inner nozzle 166 and an outer nozzle 168. Inner nozzle 166 can have, for example, a twin orifice internal mix atomizer 170 at the top of the nozzle. Suitable gas atomizers are available from Spraying Systems, Wheaton, IL. The twin orifice internal mix atomizer 170 has a fan shape to produce a thin sheet of aerosol and gaseous compositions. Liquid is fed to the atomizer through tube 172, and gases for introduction into the reaction chamber are fed to the atomizer through tube 174. Interaction of the gas with the liquid assists with droplet formation.

Outer nozzle 168 comprises a chamber section 176, a funnel section 178 and a delivery section 180. Chamber section 176 holds the atomizer of inner nozzle 166. Funnel section 178 directs the aerosol and gaseous compositions into delivery section 180. Delivery section 180 leads to a rectangular reactant opening 182, shown in the insert of FIG. 3. Reactant opening 182 forms a reactant inlet into a reaction chamber for laser pyrolysis or light reactive deposition. Outer nozzle 168 comprises a drain 184 to remove any liquid that collects in the outer nozzle. Outer nozzle 168 is covered by an outer wall 186 that forms a shielding gas opening 188 surrounding reactant opening 182. Inert shielding gas is introduced through tube 190. Additional embodiments for the introduction of an aerosol with one or more aerosol generators into an elongated reaction chamber is described in U.S. Pat. No. No. 6,193,936 to Gardner et al., entitled "Reactant Delivery Apparatuses," incorporated herein by reference.

For the formation of oxides, suitable secondary reactants serving as an oxygen source comprise, for example, $O_2$, CO, $N_2O$, $H_2O$, $CO_2$, $O_3$ and mixtures thereof. Molecular oxygen can be supplied as air. Alternatively, oxygen can be provided in a metal/metalloid precursor compound, such as a carbonyl. A secondary reactant compound, if present, should not react significantly with the metal precursor prior to entering the reaction zone since this generally would result in the formation of large particles. However, reacting precursors can be delivered into the reactant chamber through separate nozzles such that the reactant do not combine until they are near the reaction zone.

Laser pyrolysis/light reactive deposition can be performed with a variety of optical frequencies, using either a laser or other strong focused light source, such as an arc lamp. Some desirable light sources operate in the infrared portion of the electromagnetic spectrum. $CO_2$ lasers are particularly convenient sources of light. Infrared absorbers for inclusion in the reactant stream comprise, for example, $C_2H_4$, water, isopropyl alcohol, $NH_3$, $SF_6$, $SiH_4$ and $O_3$. $O_3$ can act as both an infrared absorber and as an oxygen source. The radiation absorber, such as the infrared absorber, absorbs energy from the radiation beam and distributes the energy to the other reactants to drive the reaction.

Generally, the energy absorbed from the light beam increases the temperature at a tremendous rate, many times the rate that heat generally would be produced by exothermic reactions under controlled condition. While the process generally involves nonequilibrium conditions, the temperature can be described approximately based on the energy in the absorbing region. In light reactive deposition, the reaction process is qualitatively different from the process in a combustion reactor where an energy source initiates a reaction, but the reaction is driven by energy given off by an exothermic reaction. In a combustion reactor, there is generally no well-defined reaction zone with a boundary. The reaction zone is large and the residence time of the reactants is long. Lower thermal gradients are generally present in the combustion reactor.

In contrast, the laser/light driven reactions have extremely high heating and quenching rates. The product compositions and particle properties generally depend on the laser power in the reactions zone and the quantity of radiation absorbers in the flow. By controlling the composition of the reactant flow and the light intensity in the reaction zone, the reaction product can be reproducibly controlled. The effective temperature in the reaction zone can be controlled over a wide range, for example, in the range(s) from about room temperature (e.g., 20° C.) to about 3000° C. In light reactive deposition, the reaction zone is primarily at the overlap of the light beam and the reactant stream, although the reaction zone may extend, for example, a few millimeters beyond the light beam, depending on the precise character of the reaction. After leaving the reaction zone in a radiation/light driven reactor, the particles may still be somewhat fluid/soft due to their temperature even if the reaction has terminated.

An inert shielding gas can be used to reduce the amount of reactant and product molecules contacting the reactant chamber components. Inert gases can also be introduced into the reactant stream as a carrier gas and/or as a reaction moderator. Appropriate inert shielding gases comprise, for example, Ar, He and $N_2$.

Laser pyrolysis apparatuses can be adapted for light reactive deposition. The nature of the adaptation depends on whether or not the coating is performed in the reaction chamber or within a separate coating chamber. In any of the embodiments, the reactant delivery inlet into the reaction chamber generally is configured to deliver a reactant stream with dimensions that results in a product stream with desired dimensions for the deposition process. For example, in some embodiments, the reactant inlet has a length approximately the same size or slightly larger than the diameter of a substrate such that the substrate can be coated along an entire dimension of the substrate with one pass through the product stream without wasting excessive amount of product.

Figure 5:
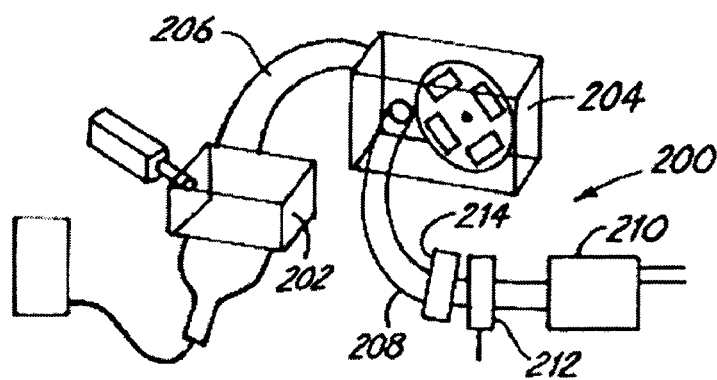
FIG. 5 is a schematic diagram of a light reactive deposition apparatus formed with a particle production apparatus connected to a separate coating chamber through a conduit.

The outlet of a laser pyrolysis apparatus can be adapted for the coating of substrates within a separate coating chamber. A coating apparatus with separate reaction chamber and coating chamber is shown schematically in FIG. 5. The coating apparatus 200 comprises a reaction chamber 202, a coating chamber 204, a conduit 206 connecting reaction chamber 202 with coating chamber 204, an exhaust conduit 208 leading from coating chamber 204 and a pump 210 connected to exhaust conduit 208. A valve 212 can be used to control the flow to pump 210. Valve 212 can be, for example, a manual needle valve or an automatic throttle valve. Valve 212 can be used to control the pumping rate and the corresponding chamber pressures. A collection system, filter, scrubber or the like 214 can be placed between the coating chamber 204 and pump 210 to remove particles that did not get coated onto the substrate surface.

Figure 6:
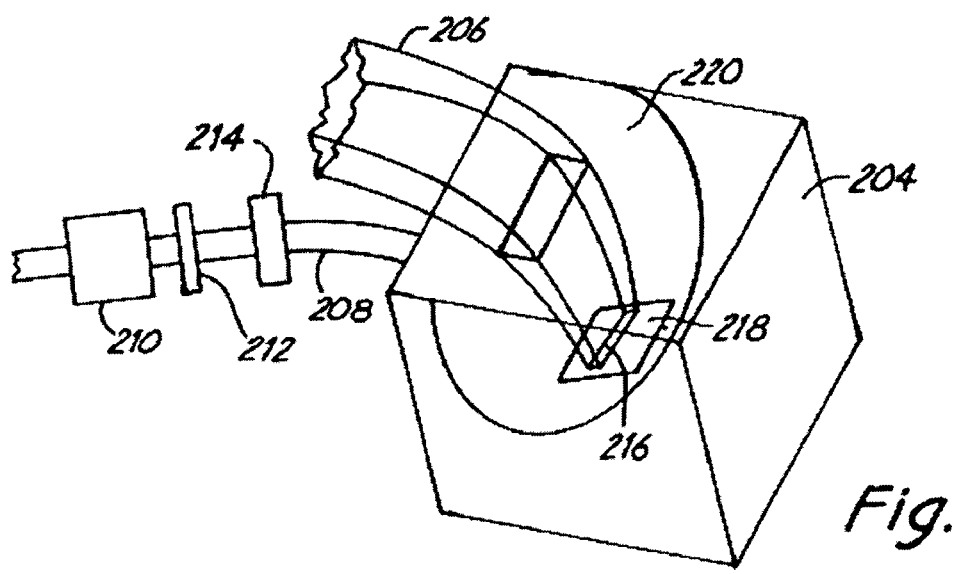
FIG. 6 is a perspective view of a coating chamber where the walls of the chamber are transparent to permit viewing of the internal components.

Referring to FIG. 6, conduit 206 from the particle production apparatus 202 leads to coating chamber 204. Conduit 206 terminates at opening 216 within chamber 204. In some embodiments, conduit opening 216 is located near the surface of substrate 218 such that the momentum of the particle stream directs the particles directly onto the surface of substrate 218. Substrate 218 can be mounted on a stage or other platform 220 to position substrate 218 relative to opening 216.

Figure 7:
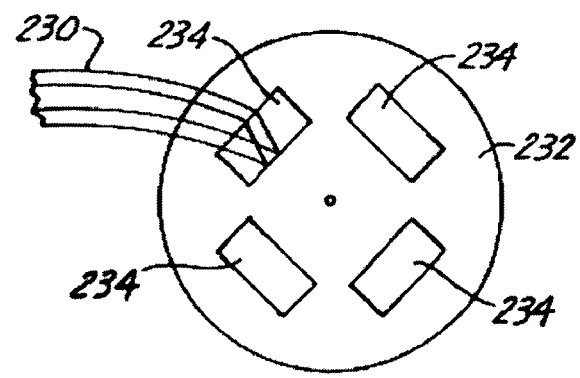
FIG. 7 is perspective view of a particle nozzle directed at a substrate mounted on a rotating stage.

An embodiment of a stage to position a substrate relative to the conduit from the particle production apparatus is shown in FIG. 7. A particle nozzle 230 directs particles toward a rotating stage 232. As shown in FIG. 7, four substrates 234 are mounted on stage 232. More or fewer substrates can be mounted on a moveable stage with corresponding modifications to the stage and size of the chamber. A motor is used to rotate stage 232. Other designs for a stage, conveyor or the like can be used to sweep the substrate through the product particle flow.

Movement of stage 232 sweeps the particle stream across a surface of one particular substrate 234 within the path of nozzle 230. Stage 232 can be used to pass sequential substrates through the product stream for one or more coating applications to each substrate. Stage 232 can comprise thermal control features that provide for the control of the temperature of the substrates on stage 232. Alternative designs involve the linear movement of a stage or other motions. In other embodiments, the particle stream is unfocused such that an entire substrate or the desired portions thereof is simultaneously coated without moving the substrate relative to the product flow.

If the coating is performed within the reaction chamber, the substrate is mounted to receive product compositions flowing from the reaction zone. The compositions may not be fully solidified into solid particles, although quenching may be fast enough to form solid particles. Whether or not the compositions are solidified into solid particles, the particles can be highly uniform. The distance from the reaction zone to the substrate can be selected to yield desired coating results.

Figure 8:
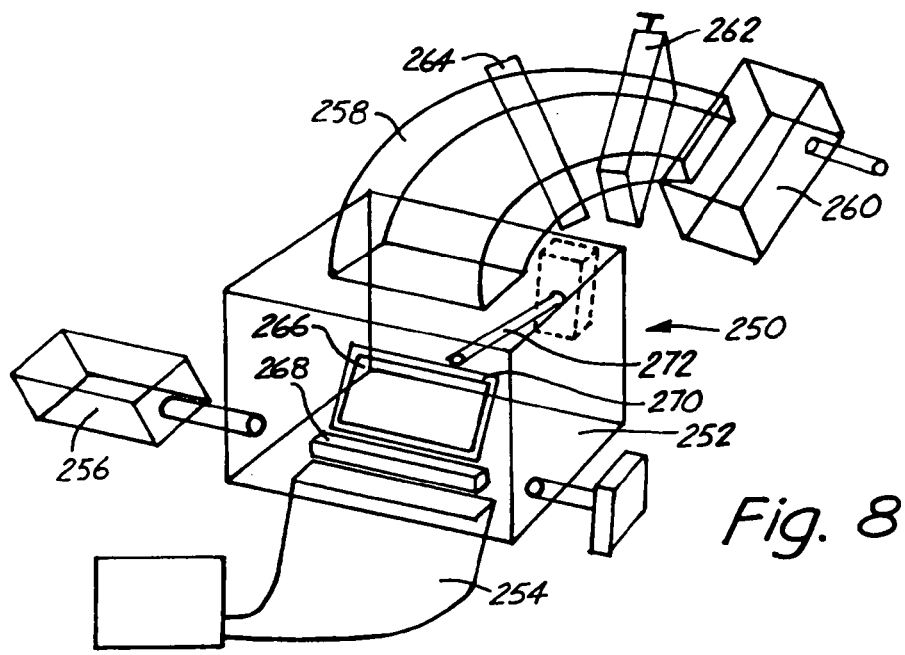
FIG. 8 is a schematic diagram of a light reactive deposition apparatus in which a particle coating is applied to a substrate within the particle production chamber.

An apparatus 250 to perform substrate coating within the reaction chamber is shown schematically in FIG. 8. The reaction/coating chamber 252 is connected to a reactant supply system 254, a radiation source 256 and an exhaust 258. Exhaust 258 can be connected to a pump 260, although the pressure from the reactant stream itself can maintain flow through the system. A valve 262 can be used to control the flow to pump 260. Valve 262 can be used to adjust the pumping rate and the corresponding chamber pressures. A collection system, filter, scrubber or the like 264 can be placed between chamber 252 and pump 260 to remove particles that did not get coated onto the substrate surface.

Substrate 266 can contact flow from a reaction zone 268 to coat the substrate with product particles/powders. Substrate 266 can be mounted on a stage, conveyor, or the like 270 to sweep substrate 266 through the flow. Stage 270 can be connected to an actuator arm 272 or other motorized apparatus to move stage 270 to sweep the substrate through the product stream. Various configurations can be used to sweep the coating across the substrate surface as the product leaves the reaction zone. A shown in FIG. 8, actuator arm 272 translates stage 270 to sweep substrate 266 through the product stream.

Figure 9:
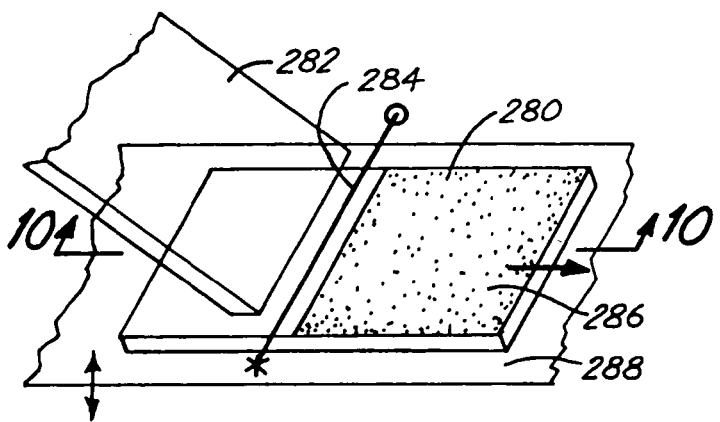
FIG. 9 is a perspective view of a reactant nozzle delivering reactants to a reaction zone positioned near a substrate.
Figure 10:
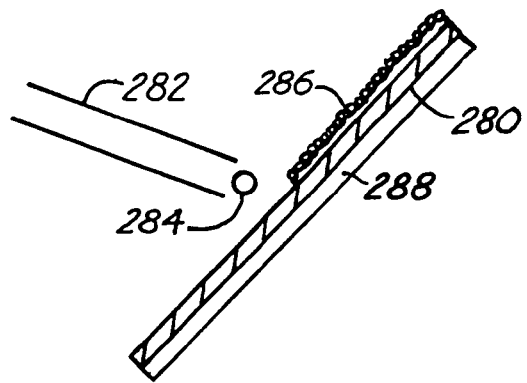
FIG. 10 is a sectional view of the apparatus of FIG. 9 taken along line 10—10.

A similar embodiment is shown in an expanded view in FIGS. 9 and 10. A substrate 280 moves relative to a reactant nozzle 282, as indicated by the right directed arrow. Reactant nozzle 282 is located just above substrate 280. An optical path 284 is defined by suitable optical elements that direct a light beam along path 284. Optical path 284 is located between nozzle 282 and substrate 280 to define a reaction zone just above the surface of substrate 280. The hot particles tend to attract to the cooler substrate surface.

Referring to FIGS. 9 and 10, a particle coating 286 is formed as the substrate is scanned past the reaction zone. In general, substrate 280 can be carried on a conveyor/stage 288. Conveyor/stage 288 can be connected to an actuator arm, as shown in FIG. 8. In alternative embodiments, rollers and a motor, a continuous belt conveyor, or any of a variety of design, comprising known designs, for translating a substrate can be used to carry the substrate.

In some embodiments, the position of conveyor 288 can be adjusted to alter the distance from substrate 286 to the reaction zone. Changes in the distance from substrate to the reaction zone correspondingly alter the temperature of the particles striking the substrate. The temperature of the particles striking the substrate generally alters the properties of the resulting coating and the requirements for subsequent processing, such as a subsequent heat processing consolidation of the coating. The distance between the substrate and the reaction zone can be adjusted empirically to produce desired coating properties. In addition, the stage/conveyor supporting the substrate can comprise thermal control features such that the temperature of the substrate can be adjusted to higher or lower temperatures, as desired.

Figure 11:
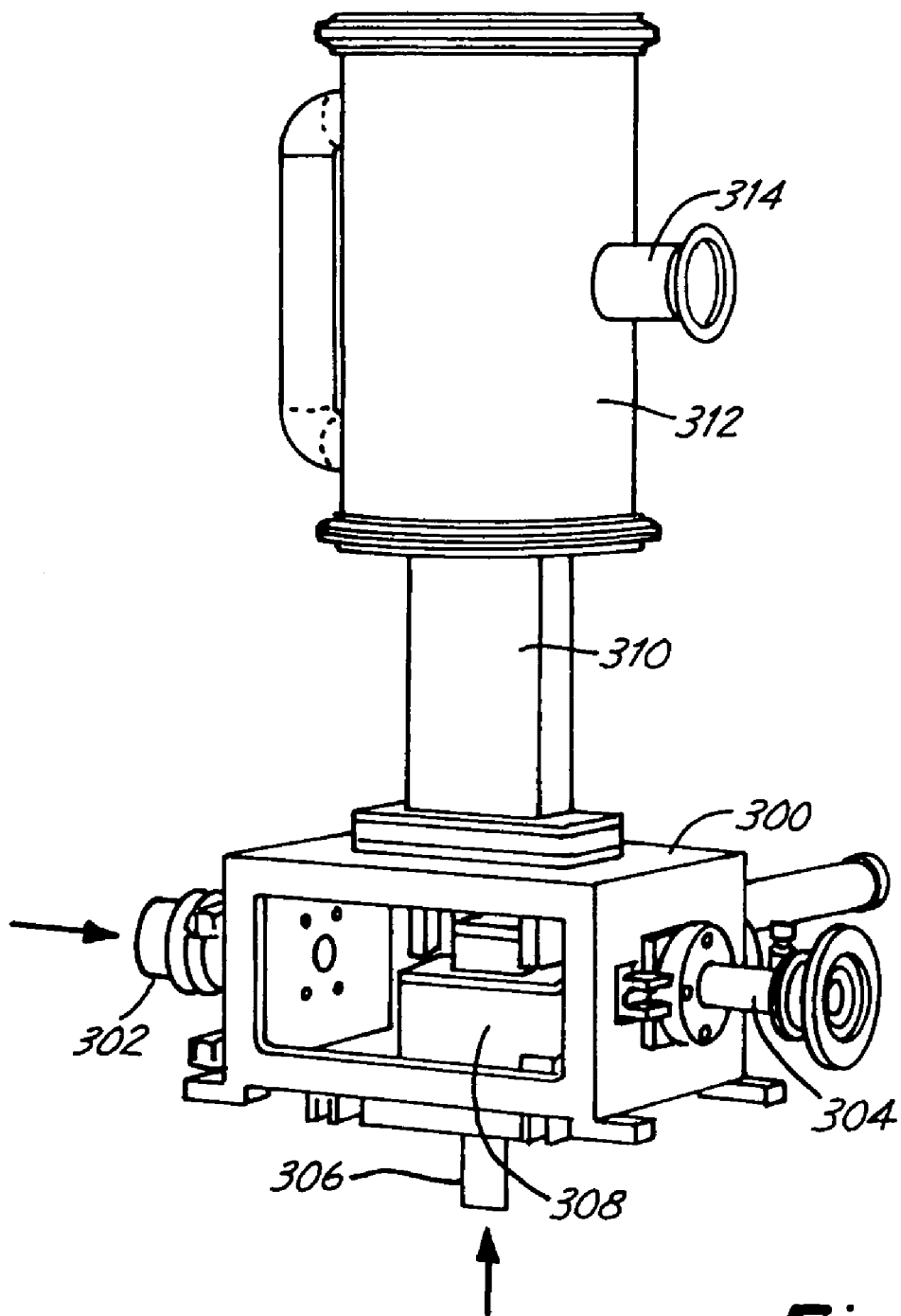
FIG. 11 is a perspective view of an embodiment of a light reactive deposition chamber.
Figure 12:
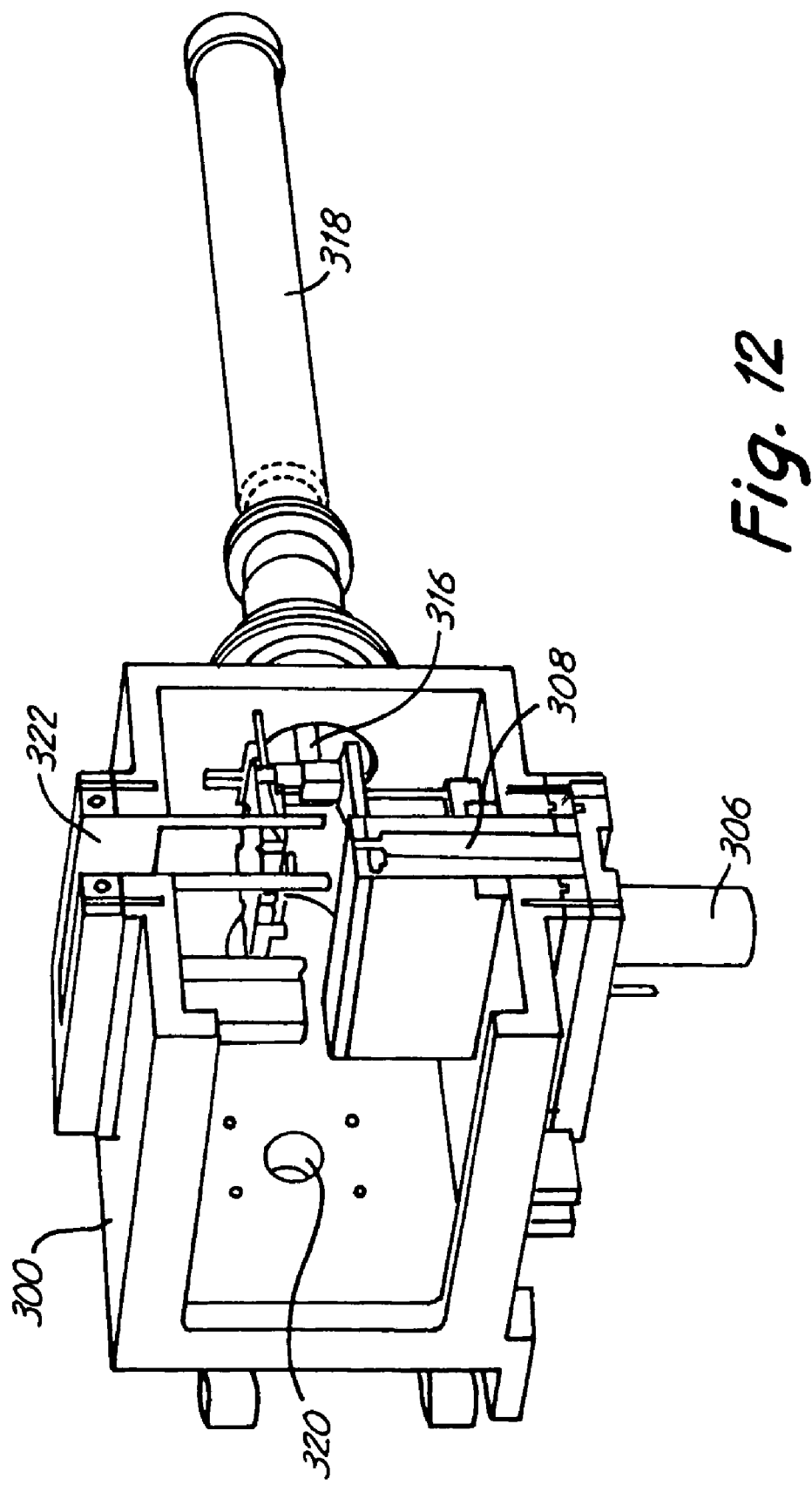
FIG. 12 is an expanded view of the reaction chamber of the light reactive deposition chamber of FIG. 11.
Figure 13:
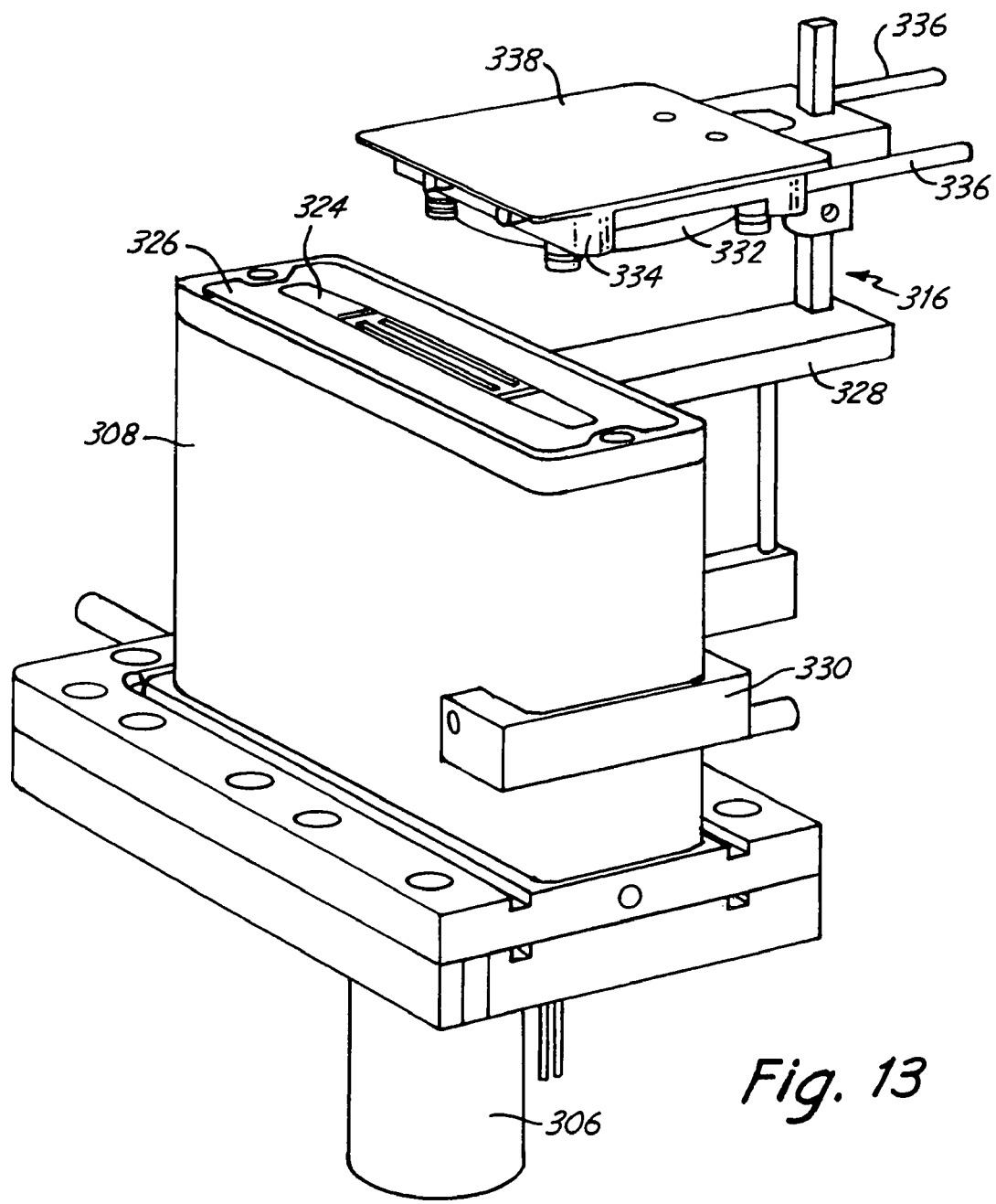
FIG. 13 is an expanded view of the substrate support of the reaction chamber of FIG. 12.

A particular embodiment of a light reactive deposition apparatus is shown in FIGS. 11–13. Referring to FIG. 11, process chamber 300 comprises a light tube 302 connected to a $CO_2$ laser (not shown) and a light tube 304 connected to a beam dump (not shown). An inlet tube 306 connects with a precursor delivery system that delivers vapor reactants and carrier gases. Inlet tube 306 leads to process nozzle 308. An exhaust tube 310 connects to process chamber 300 along the flow direction from process nozzle 308. Exhaust tube 310 leads to a particle filtration chamber 312. Particle filtration chamber 312 connects to a pump at pump connector 314.

An expanded view of process chamber 300 is shown in FIG. 12. A wafer carrier 316 supports a wafer above process nozzle 308. Wafer carrier 316 is connected with an arm 318, which translates the wafer carrier to move the wafer through the particle stream emanating from the reaction zone where the laser beam intersects the precursor stream from process nozzle 308. Arm 318 comprises a linear translator that is shielded with a tube. A laser entry port 320 is used to direct a laser beam between process nozzle 308 and the wafer.

Unobstructed flow from process nozzle would proceed directly to exhaust nozzle 322, which leads to particle transport tube 310.

An expanded view of wafer carrier 316 and process nozzle 308 is shown in FIG. 13. The end of process nozzle 308 has an opening for precursor delivery 324 and a shielding gas opening 326 around precursor opening to confine the spread of precursor and product particles. Wafer carrier 316 comprises a support 328 that connects to process nozzle 308 with a bracket 330. A circular wafer 332 is held in a mount 334 such that wafer 332 slides within mount 334 along tracks 336 to move wafer 332 into the flow from the reaction zone. Backside shield 338 prevents uncontrolled deposition of particles on the back of wafer 332. Tracks 336 connect to arm 318.

The temperature of the substrate during the deposition process can be adjusted to achieve particular objectives. For example, the substrate can be cooled during the deposition process since a relatively cool substrate can attract the particles to its surface. However, in some embodiments, the substrate is heated, for example to about 500° C., during the deposition process. Particles stick better to a heated substrate. In addition, the particles tend to compact and fuse on a heated substrate such that a subsequent consolidation of the coating into a fused glass or other material is facilitated if the coating were formed initially on a heated substrate.

The formation of coatings by light reactive deposition, silicon glass deposition and optical devices in general are described further in copending and commonly assigned U.S. patent application Ser. No. 09/715,935 to Bi et al., entitled "Coating Formation By Reactive Deposition," incorporated herein by reference, and in copending and commonly assigned PCT application designating the U.S. serial number PCT/US01/32413 to Bi et al. filed on Oct. 16, 2001, entitled "Coating Formation By Reactive Deposition," incorporated herein by reference.

The well-defined reactant stream as a sheet of flow leading into the reaction zone tends to spread after the reaction zone due to heat from the reaction. If the substrate is swept through the reaction zone near the reaction zone, the spreading of the flow may not be significant. In some embodiments, it may be desirable to contact the substrate with the flow farther away from the reaction zone such that the flow has spread significantly and the entire substrate or desired portion thereof can be coated simultaneously without moving the substrate. The appropriate distance to obtain a uniform coating of particles depends on the substrate size and the reaction conditions. A typical distance of about 15 centimeters would be suitable for a wafer with a 4-inch diameter. Then, when the composition of the product particle flow is changed in time during the deposition process, the composition of the particles changes through the thickness of the coating. If the composition is changed continuously, a continuous composition gradient through the layer results. For optical materials, generally a continuous composition gradient layer having a continuous composition change from a first composition to a second composition has a thickness of no more than about 300 microns, in other embodiments no more than about 150 microns, in further embodiments, in the range(s) from about 500 nm to about 100 microns and in still other embodiments in the range(s) from about 1 micron to about 50 microns. A person of ordinary skill in the art will recognize that other ranges and subranges within the explicit ranges are contemplated and are encompassed within the present disclosure.

Alternatively, the composition can be changed incrementally or discretely to produce layers with varying composition, which can involve a gradual change in composition between two compositions or discrete layers with discrete composition differences. The resulting transition material has a step-wise change in composition from a first composition to a second composition. Generally, the first composition and second composition are the compositions of the adjacent layers such that the transition material provides a gradual transition in composition between the two adjacent layers. While an optical transition material can have two layers, the transition material generally has at least three layers, in other embodiments at least 4 layers and in further embodiments in the range(s) from 5 layers to 100 layers. A person of ordinary skill in the art will recognize that additional range(s) within these specific ranges are contemplated and are within the present disclosure. The total thickness generally is similar to the continuous gradient layers described in the previous paragraph. Each layer within the step-wise transition material generally has a thickness less than about 100 microns, in other embodiments less than about 25 microns, in further embodiments in the range(s) from about 500 nm to about 20 microns and in additional embodiments in the range(s) from about 1 micron to about 10 microns. The layers within the step-wise transition material may or may not have approximately equal thickness. Similarly, the step-wise change in composition may or may not take equivalent steps between layers of the transition material.

For the production of discrete optical devices or other structures on a substrate surface, the composition of the optical material generally must be different at different locations within the optical structure. To introduce the composition variation, the deposition process itself can be manipulated to produce specific structures. Alternatively, various patterning approaches can be used following the deposition. These approaches can be adapted for the formation of gradient index lenses.

Using the deposition approaches described herein, the composition of product particles deposited on the substrate can be changed during the deposition process to deposit particles with a particular composition at selected locations on the substrate to vary the resulting composition of the optical material along the x-y plane. Using light reactive deposition, the product composition can be varied by adjusting the reactants that react to form the product particle or by varying the reaction conditions. The reactant flow can comprise vapor and/or aerosol reactants, which can be varied to alter the composition of the products. In particular, dopant concentrations can be changed by varying the composition and/or quantity of dopant elements in the flow. The reaction conditions can also affect the resulting product particles. For example, the reaction chamber pressure, flow rates, radiation intensity, radiation energy/wavelength, concentration of inert diluent gas in the reaction stream, temperature of the reactant flow can affect the composition and other properties of the product particles.

While product particle composition changes can be introduced by changing the reactant flow composition or the reaction conditions while sweeping a substrate through the product stream, it may be desirable, especially when more significant compositional changes are imposed to stop the deposition between the different deposition steps involving the different compositions. For example, to coat one portion of a substrate with a first composition and the remaining portions with another composition, the substrate can be swept through the product stream to deposit the first composition to a specified point at which the deposition is terminated. The substrate is then translated the remaining distance without any coating being performed. The composition of the product is then changed, by changing the reactant flow or reaction conditions, and the substrate is swept, after a short period of time for the product flow to stabilize, in the opposite direction to coat the second composition in a complementary pattern to the first composition. A small gap can be left between the coatings of the first composition and the second composition to reduce the presence of a boundary zone with a mixed composition. The small gap can fill in during the consolidation step to form a smooth surface with a relatively sharp boundary between the two materials.

This process can be generalized for the deposition of more than two compositions and/or more elaborate patterns on the substrate. In the more elaborate processes, a shutter can be used to block deposition while the product flow is stabilized and/or while the substrate is being positioned. A precision controlled stage/conveyor can precisely position and sweep the substrate for the deposition of a particular composition. The shutter can be rapidly opened and closed to control the deposition. Gaps may or may not be used to slightly space the different location of the compositions within the pattern.

In other embodiments, a discrete mask is used to control the deposition of particles. A discrete mask can provide an efficient and precise approach for the patterning of particles. With chemical vapor deposition and physical vapor deposition, a layer of material is built up from an atomic or molecular level, which requires binding of the mask at an atomic or molecular level to prevent migration of the material being deposited under the mask to blocked regions. Thus, the "masks" are a coating on the surface without an independent, self-supporting structure corresponding to the mask, and the "mask" is chemically or physically bonded to the surface with atomic level contact along the "mask". In contrast, with particle deposition, the particles generally can be at least macromolecular in size with diameters of about 3 nanometers (nm) or more such that a mask with a flat surface placed against another flat surface provides sufficient contact to prevent significant particle migration past the mask. The discrete masks have an intact self-supporting structure that is not bonded to the surface such that the mask can be removed intact from the surface that is coated. Therefore, the discrete mask approach herein is different from previous masking approaches adapted from photolithography for vapor deposition approaches.

The formation of the particle coating involves directing a product particle stream at the substrate shielded with the discrete mask. The discrete mask has a planar surface with openings at selected locations. The discrete mask blocks the surface except at the openings such that particles can deposit on the surface through the openings. Thus, the mask provides for patterning compositions on the surface by the selected placement of the openings. Suitable discrete masks comprise a mask with a slit that is narrower than the product particle flow such that the deposition process can be very precisely controlled. Movement of the slit can form a desired, precisely controlled pattern with one or more compositions. After use of a discrete mask, it can be removed and reused.

In some embodiments, a plurality of masks is used to deposit particles along a single layer. For example, following deposition of a pattern through a first mask, a second complementary mask can be used to deposit material over at least a portion of the surface left uncovered during deposition with the first mask. Further complementary masks can be used to form complex patterns while completing a single layer or portion thereof with a coating having varying chemical composition over the layer.

Thus, using light reactive deposition, a range of effective approaches are available to vary the chemical composition of optical materials within layers and in different layers to form three-dimensional optical structures with selected compositions are selected locations within the material. In other words, the optical properties and/or composition of the materials can be varied along all three axes, x, y and z, within the optical structure to firm desired structures. The patterning of compositions of optical materials during the deposition process is described further in and commonly assigned U.S. patent application Ser. No. 10/027,906, now U.S. Pat. No. 6,952,504 to Bi et al., entitled "Three Dimensional Engineering of Optical Structures," incorporated herein by reference.

Compositions and Properties of Particles and Coatings

A variety of particles can be produced by laser pyrolysis/light reactive deposition. Adaptation of laser pyrolysis for the performance of light reactive deposition can be used to produce coatings of comparable compositions as the particles with selected compositions that can be produced by laser pyrolysis. Powders of particular interest comprise, for example, silicon particles, metal particles, and metal/metalloid compounds, such as, metal/metalloid oxides, metal/metalloid carbides, metal/metalloid nitrides, and metal/metalloid sulfides. For optical materials, some materials of particular interest comprise, for example, silicon oxide (silica), phosphate glasses, germanium oxide, InP, lithium niobate, telluride glasses, aluminum oxide, titanium oxide, combinations thereof and doped versions thereof. The particles can be doped to alter the optical, chemical and/or physical properties of the particles. Generally, the powders comprise fine or ultrafine particles with particle sizes in the submicron or nanometer range. The particles may or may not partly fuse or sinter during the deposition.

Laser pyrolysis/light reactive deposition is particularly suitable for the formation of highly uniform particles, especially nanoscale particles. In particular, laser pyrolysis can produce a collection of particles of interest generally with an average diameter for the primary particles of less than about 500 nm, alternatively in the range(s) from about 3 nm to about 100 nm, similarly in the range(s) from about 3 nm to about 75 nm, and also in the range(s) from about 3 nm to about 50 nm. Persons of ordinary skill in the art will recognize that other ranges and subranges within these specific ranges are contemplated and are covered by the present disclosure.

Laser pyrolysis/light reactive deposition, as described above, generally results in primary particles having a very narrow range of particle diameters. With aerosol delivery of reactants for laser pyrolysis/light reactive deposition, the distribution of particle diameters can be particularly sensitive to the reaction conditions. Nevertheless, if the reaction conditions are properly controlled, a very narrow distribution of particle diameters can be obtained with an aerosol delivery system. However, with aerosol and/or vapor reactants broader distributions of primary particles sizes can also be obtained, if desired, by controlling the flow rates, reactant densities and residence times in laser pyrolysis/light reactive deposition or using other flowing reaction systems.

In embodiments with highly uniform particles, effectively no primary particles have an average diameter greater than about 4 times the average diameter and in other embodiments 3 times the average diameter, and in further embodiments 2 times the average diameter. In other words, the particle size distribution effectively does not have a tail indicative of a small number of particles with significantly larger sizes. An effective cut off in the tail of the size distribution indicates that there are less than about 1 particle in 10⁶ have a diameter greater than a specified cut off value above the average diameter. Narrow size distributions, lack of a tail in the distributions and a roughly spherical morphology can be advantageous for obtaining highly uniform particle coatings and for highly uniform densified materials following consolidation.

Small particle size, spherical morphology and particle uniformity can contribute overall to the uniformity of the resulting coating, for example, with respect to composition as well as the smoothness of the surface and interfaces between materials. In particular, the lack of particles significantly larger than the average, i.e., the lack of a tail in the particle size distribution, leads to a more uniform coating. In addition, the particles can have a very high purity level.

When collecting the particles directly onto a substrate surface, the distance from the substrate to the reaction zone and the temperature of the substrate can be adjusted to control the character of the deposit on the substrate surface. The particles on the surface form a particle array. The particle array can be in the form of independent primary particles randomly stacked on the surface. The array of primary particles may only be held together by electromagnetic forces between adjacent and nearby particles. In some embodiments, it may be desirable to form a particle array with some degree of hard fusing between primary particles. Fusing between primary particles can be achieved by placing the substrate closer to the reaction zone such that the particles are not fully quenched when they strike the substrate surface and/or by heating the substrate. Even if the primary particles are hard fused, the resulting particle array maintains character due to the nanoscale, i.e., submicron scale, of the primary particles. In particular, primary particles may be visible in scanning electron micrographs. In addition, channels between the fused particles will reflect the nanoscale of the surrounding fused particles, e.g., by having nanoscale diameter channels extending into the powder array. Thus, the nanoscale character of the primary particles is built into the resulting powder array formed from the nanoscale primary particles.

While nanoscale particles can in principle pack densely on a surface due to their small size, the particles tend to coat a surface as a loose array due to electrostatic forces between the particles. The relative or apparent density of the powder array can depend on the particle size, particle composition and the deposition conditions, which may affect particle fusing as well as the forces between the particles and with the surface. The relative density is evaluated relative to the fully densified material of the same composition. In general, the relative density for the powder array formed from nanoscale particles is in the range(s) of less than about 0.6, in other embodiments in the range(s) from about 0.02 to about 0.55 and in further embodiments in the range(s) from about 0.05 to about 0.4. A person of ordinary skill in the art will recognize that additional ranges within these specific ranges are contemplated and are within the present disclosure.

Laser pyrolysis/light reactive deposition can be performed with gas/vapor phase reactants. Many metal/metalloid precursor compounds can be delivered into the reaction chamber as a vapor. Metalloids are elements that exhibit chemical properties intermediate between or inclusive of metals and nonmetals. Metalloid elements include, for example, silicon, boron, arsenic, antimony, and tellurium. While phosphorous is located in the periodic table near the metal elements, it is not generally considered a metalloid element. However, phosphorous in the form of $P_2O_5$ is a good glass former similar to some metalloid oxides, and doped forms of $P_2O_5$ can have desirable optical properties. For convenience, as used herein comprising in the claims, phosphorous is also considered a metalloid element. Appropriate metal/metalloid precursor compounds for gaseous delivery generally comprise metal compounds with reasonable vapor pressures, i.e., vapor pressures sufficient to get desired amounts of precursor gas/vapor into the reactant stream. The vessel holding liquid or solid precursor compounds can be heated to increase the vapor pressure of the metal precursor, if desired. Solid precursors generally are heated to produce a sufficient vapor pressure by sublimation or by melting the solid into a liquid.

As an example of suitable precursors for optical material formation, representative silicon precursors for vapor delivery comprise, for example, silicon tetrachloride ($SiCl_4$), trichlorosilane ($Cl_3HSi$), trichloromethyl silane $CH_3SiCl_3$, tetramethoxysilane ($Si(OCH_3)_4$) and tetraethoxysilane ($Si(OC_2H_5)_4$, also known as ethyl silane and tetraethyl silane).

Suitable dopants for silicon oxide materials include, for example, boron, germanium, phosphorous, titanium, tin, zinc and aluminum. Suitable boron precursors for gas/vapor delivery include, for example, boron trichloride ($BCl_3$), diborane ($B_2H_6$), tetraethoxyboride and $BH_3$. Suitable phosphorous precursors for gas/vapor delivery include, for example, phosphine ($PH_3$), tetraethoxyphosphide, phosphorus trichloride ($PCl_3$), phosphorus oxychloride ($POCl_3$) and $P(OCH_3)_3$. Suitable germanium precursors for gas/vapor delivery include, for example, tetraethoxygermanate, $GeCl_4$. Suitable titanium precursors for gas/vapor delivery include, for example, titanium tetrachloride ($TiCl_4$), and titanium isopropoxide ($Ti[OCH(CH_3)_2]_4$). Suitable tin precursors include, for example, $SnCl_4$ and liquid organometallic tin compounds such as $(C_4H_9)SnCl_3$ (n-butyl tin trichloride), $(CH_2CH)_2 SnCl_2$ (divinyl tin dichloride) and $(C_4H_9)_3 SnCl$ (tri-n-butyl tin chloride). Suitable liquid zinc precursor compounds for gas/vapor delivery include, for example, diethyl zinc ($Zn(C_2H_5)_2$) and dimethyl zinc ($Zn(CH_3)_2$). Suitable solid, zinc precursors with sufficient vapor pressure of vapor delivery include, for example, zinc chloride ($ZnCl_2$). Suitable liquid, aluminum precursors for gas/vapor delivery include, for example, aluminum s-butoxide ($Al(OC_4H_9)_3$). A number of suitable solid, aluminum precursor compounds are available including, for example, aluminum chloride ($AlCl_3$), aluminum ethoxide ($Al(OC_2H_5)_3$), and aluminum isopropoxide ($Al[OCH(CH_3)_2]_3$). Suitable germanium precursors for aerosol delivery comprise, for example, $Ge(OC_2H_5)_3$, $Ge(OCH_3)_4$, and the like, and suitable combinations of any two or more thereof. Precursors for other additives, dopants and host materials can be similarly selected based on analogy with these specific precursors.

The use of exclusively gas phase reactants is somewhat limiting with respect to the types of precursor compounds that can be used conveniently. Thus, techniques can be used to introduce aerosols containing reactant precursors to the reaction zone. Suitable aerosol delivery apparatuses adapted for performing light reactive deposition are described above.

Using aerosol delivery apparatuses, solid precursor compounds can be delivered by dissolving the compounds in a solvent. Alternatively, powdered precursor compounds can be dispersed in a liquid/dispersant for aerosol delivery. Liquid precursor compounds can be delivered as an aerosol from a neat liquid, a multiple liquid dispersion or a liquid solution. A solvent/dispersant can be selected to achieve desired properties of the resulting solution/dispersion. While a particular solvent/dispersant can be selected based on the precursors and other reaction parameters, suitable solvents/dispersants generally include, for example, water, methanol, ethanol, isopropyl alcohol, other organic solvents and mixtures thereof. The solvent should have a desired level of purity such that the resulting particles have a desired purity level. Some solvents, such as isopropyl alcohol, are significant absorbers of infrared light from a $CO_2$ laser such that no additional laser absorbing compound may be needed within the reactant stream if a $CO_2$ laser is used as a light source.

If aerosol precursors are used, the liquid solvent/dispersant can be rapidly evaporated by the light beam in the reaction chamber such that a gas phase reaction can take place. Thus, the fundamental features of the laser pyrolysis/light reactive deposition reaction may be unchanged by the presence of an aerosol. Nevertheless, the reaction conditions can be affected by the presence of the aerosol.

A number of suitable solid precursor compounds can be delivered as an aerosol from solution. As an example of suitable aerosol precursors for optical materials, suitable silicon precursors for aerosol production comprise, for example, silicon tetrachloride $Si(Cl_4)$, which is soluble in ether, and trichlorosilane $(Cl_3HSi)$, which is soluble in carbon tetrachloride. Suitable silicon oxide dopants also can be delivered in an aerosol. Stannous chloride $(SnCl_2)$ is soluble in alcohol. For example, zinc chloride $(ZnCl_2)$ and zinc nitrate $(Zn(NO_3)_2)$ are soluble in water and some organic solvents, such as isopropyl alcohol. Similarly, a boron dopant can be delivered as an aerosol using ammonium borate $((NH_4)_2B_4O_7)$, which is soluble in water and various organic solvents. Precursors for other dopants and host materials can be similarly selected based on analogy with these specific precursors.

The precursor compounds for aerosol delivery can be dissolved in a solution generally with a concentration greater than about 0.1 molar. For a particular aerosol flow rate, the greater the concentration of precursor in the solution the greater the throughput of reactant through the reaction chamber. As the concentration increases, however, the solution can become more viscous such that the aerosol may have droplets with larger sizes than desired. Thus, selection of solution concentration can involve a balance of factors in the selection of a desired solution concentration.

Several different types of nanoscale particles have been produced by laser pyrolysis. Similar particles can be produced for light reactive deposition based on the description above. Such nanoscale particles for light reactive deposition can generally be characterized as comprising a composition comprising a number of different elements that are present in varying relative proportions, where the number and the relative proportions are selected based on the application for the nanoseale particles. Materials tat have been produced (possibly with additional processing, such as a heat treatment) or have been described in detail for production by laser pyrolysis/light reactive deposition include, for example, amorphous $SiO_2$, doped $SiO_2$, crystalline silicon dioxide, titanium oxide (anatase and ruffle $TiO_2$), MnO, $Mn_2O_3$, $Mn_3O_4$, $Mn_5O_8$, vanadium oxide, silver vanadium oxide, lithium manganese oxide, aluminum oxide ($\gamma$-$Al_2O_3$, delta-$Al_2O_3$ and theta-$Al_2O_3$), doped-crystalline and amorphous alumina, tin oxide, zinc oxide, rare earth metal oxide particles, rare earth doped metal/metalloid oxide particles, rare earth, metal/metalloid sulfides, rare earth doped metal/metalloid sulfides. silver metal, iron, iron oxide, iron carbide, iron sulfide ($Fe_{1-x}S$), cerium, oxide, zirconium oxide, barium titanate ($BaTiO_3$), aluminum silicate, aluminum titanate, silicon carbide, silicon nitride, and metal/metalloid compounds with complex anions, fur example, phosphates, silicates and sulfates. In particular, many materials suitable for the production of optical materials can be produced by light reactive deposition. The production of particles by laser pyrolysis and corresponding deposition by light reactive deposition having ranges of compositions is described further in copending and commonly assigned U.S. patent application Ser. No. 10/027,906, now U.S. Pat. No. 6,952, 504 to Bi et al., entitled "Three Dimensional Engineering of Optical Structures," incorporated herein by reference.

Submicron and nanoscale particles can be produced with selected dopants using laser pyrolysis and other flowing reactor systems. Amorphous powders and glass layers can be formed with complex compositions comprising a plurality of selected dopants. The powders can be used to form optical materials and the like. The glass layers can be formed by directly depositing a uniform particle coating using light reactive deposition and subsequently consolidating the powder into a uniform glass layer. Amorphous submicron and nanoscale powders and glass layers with complex compositions having multiple metal/metalloid elements and/or dopants, such as rare earth dopants and/or other metal dopants, are described further in copending and commonly assigned U.S. patent application Ser. No. 10/099,597, now U.S. Pat. No. 6,849,334 filed on Mar. 15, 2002 to Home et al., entitled "Optical Materials And Optical Devices," incorporated herein by reference.

Additives and/or dopants can be introduced at desired stoichiometries by varying the composition of the reactant stream. Any additives/dopants are introduced into an appropriate host glass forming material. By appropriately selecting the composition in the reactant stream and the processing conditions, submicron particles incorporating one or more metal or metalloid elements as glass-forming hosts with selected additives and/or dopants, including, for example, rare earth dopants and/or complex blends of dopant compositions, can be formed. Since the host amorphous materials generally are oxides, an oxygen source should also be present in the reactant stream. The conditions in the reactor should be sufficiently oxidizing to produce the oxide materials.

Additives/dopants can be introduced to vary properties of the amorphous particles and/or a resulting glass layer. For example, additives/dopants can be introduced to change the index-of-refraction of the glass. For optical applications, the index-of-refraction can be varied to form specific optical devices that operate with light of a selected frequency range. Additives/dopants can also be introduced to alter the processing properties of the material. In particular, some additives/dopants change the flow temperature, i.e., the glass transition temperature, such that the glass can be processed at lower temperatures. In particular, boron and phosphorous elements can help to lower the viscosity and therefore the flow temperature of silicon oxide. Lowering the flow temperature can be desirable for reducing stress and the attendant birefringence and for improving the consolidation of multiple layers where lower flow temperature materials are placed on top of existing coatings. Boron dopants also lowers the index-of-refraction of silica glass while phosphorous dopants raise the index-of-refraction of silica glass. Additives/dopants can also interact within the materials. For example, some additives/dopants are introduced to increase the solubility of other elements/compounds.

Some particles of interest comprise amorphous compositions that form optical glasses with a plurality of additives/dopants such that the various properties can be selected as desired. In some embodiments, the one or plurality of dopants are rare earth metals or rare earth metals with one or more other dopant elements. Rare earth metals comprise the transition metals of the group IIIb of the periodic table. Specifically, the rare earth elements comprise Sc, Y and the Lanthanide series. Other suitable dopants comprise elements of the actinide series. For optical glasses, the rare earth metals of particular interest as dopants comprise, for example, Ho, Eu, Ce, Th, Dy, Er, Yb, Nd, La, Y, Pr and Tm. Generally, the rare earth ions of interest have a +3 ionization state, although $Eu^{+2}$ and $Ce^{+4}$ are also of interest. Rare earth dopants can influence the optical absorption properties that can alter the application of the materials for the production of optical amplifiers and other optical devices. Suitable non-rare earth metal dopants for optical glasses comprise, for example, Bi, Sb, Zr, Pb, Li, Na, K, Ba, B, Ge, W, Co, Ca, Cr, Ga, Al, Mg, Sr, Zn, Ti, Ta, Nb, Mo, Th, Cd and Sn.

In addition, suitable metal oxide additives/dopants for aluminum oxide for optical glass formation comprise cesium oxide ($Cs_2O$), rubidium oxide ($Rb_2O$), thallium oxide ($Tl_2O$), lithium oxide ($Li_2O$), sodium oxide ($Na_2O$), potassium oxide ($K_2O$), beryllium oxide (BeO), magnesium oxide (MgO), calcium oxide (CaO), strontium oxide (SrO) and barium oxide (BaO). Aluminum oxide additives/dopants can affect, for example, the index-of-refraction, consolidation temperature and/or the porosity of the glass.

Material processing remains a significant consideration in the design of desired optical devices. For example, the composition and properties, such as density, of a material are adjusted to obtain materials with a desired index-of-refraction. Similarly, the thermal expansion and flow temperatures of a material have to be consistent with a reasonable processing approach for forming the materials into a monolithic, integrated structure without excessive stress that can introduce undesirable optical properties such as unintentional birefringence. The consolidated optical materials can provide high transparency and homogeneity at the operating wavelength such that light transmission through the materials does not result in undesirable amount of loss. In addition, the materials have to be processable under reasonable conditions to form the integrated devices of integrated optical circuits or electro-optical circuits.

To obtain particular objectives, the features of the coating can be varied with respect to composition of layers of the powders as well as location of materials on the substrate. Generally, to form an optical device an optical material can be localized to a particular location on the substrate. In addition, multiple layers of particles can be deposited in a controlled fashion to form layers with different compositions and/or optical properties. Similarly, the coating can be made a uniform thickness, or different portions of the substrate can be coated with different thicknesses of particles. Different coating thicknesses can be applied such as by varying the sweep speed of the substrate relative to the particle nozzle, by making multiple sweeps of portions of the substrate that receive a thicker particle coating or by patterning the layer, for example, with a mask.

Thus, layers of materials, as described herein, may comprise particular layers that do not have the same planar extent as other layers. Thus, some layers may cover the entire substrate surface or a large fraction thereof while other layers cover a smaller fraction of the substrate surface. In this way, the layers can form one or more localized devices. At any particular point along the planar substrate, a sectional view through the structures may reveal a different number of identifiable layers than at other point along the surface. Generally, for optical applications, the particle coatings of a particular optical layer have a thickness in the range less than about 500 microns, in other embodiments, in the range less than about 250 microns, in additional embodiments in the range(s) from about 50 nanometers to about 100 microns and in further embodiments in the range(s) from about 100 nanometers to about 50 microns. A person of ordinary skill in the art will recognize that additional range(s) within these explicit ranges and subranges are contemplated and are encompassed within the present disclosure.

Consolidation to Form Optical Materials

Heat treatment can melt and fuse the particles and lead to compaction, i.e., densification, of the powders to form the desired material, such as an optical material. This fusing of the particles is generally referred to as consolidation. To consolidate, i.e., densify, the optical materials, the materials can be heated to a temperature above the melting point or the flow temperature, i.e., softening point, of the material to consolidate the coating into a smooth uniform material. Consolidation can be used to form amorphous or crystalline phases in layers. In general, consolidation can be performed before or after patterning of a layer. Using the techniques described herein, doped glasses can be formulated into planar optical devices.

Generally, the heating is performed under conditions to melt the particles into a viscous liquid. To form the viscous liquid, crystalline particles are heated above their melting point and amorphous particles are heated above their softening point. Because of the high viscosity, the material does not flow significantly on the substrate surface. Processing at higher temperatures to reduce the viscosity of the melt can result in undesirable melting of the substrate, migration of compositions between layers or in flow from a selected area of the substrate. The heating and quenching times can be adjusted to change the properties of the consolidated coatings, such as density. In addition, heat treatment can remove undesirable impurities and/or change the stoichiometry and crystal structure of the material.

Following deposition of the powder layer, the precursors can be shut off such that the reactant stream only comprises a fuel and an oxygen source that reacts to form a product without particles. The flame resulting from the reaction of the fuel and oxygen source can be used to heat the coated substrate. Such a heating step can reduce additive/dopant migration upon full consolidation of a doped silica glass. A preliminary heat treatment can be applied with the reactor flame to reduce dopant migration during the consolidation process. A flame heating step can be perform between coating steps for one or more layers prior to a heat treatment to fully consolidate the material.

Suitable processing temperatures and times generally depend on the composition of the particles. Small particles on the nanometer scale generally can be processed at lower temperatures and/or for shorter times relative to powders with larger particles due to lower melting/softening points for the nanoparticles in comparison with bulk material. However, it may be desirable to use a comparable melting temperature to obtain greater surface smoothness from improved melting of the nanoparticles.

For the processing of silicon oxide nanoparticles, the particle coatings can be heated to a temperature from about 800° C. to 1700° C., although with silicon substrates the upper limit is about 1350° C. Higher temperatures can be reached with appropriate ceramic substrates. Dopants in the silicon oxide particles can lower the appropriate consolidation temperatures. Thus, the dopant can be selected to flow into a uniform optical material at a lower temperature.

Suitable dopants to lower the flow temperature when placed into silicon oxide ($SiO_2$) include, for example, boron, phosphorous, germanium, and combinations thereof The amount and composition of one or more dopants can be selected to yield a desired flow temperature for consolidation and index-of-refraction of the consolidated optical material.

Heat treatments can be performed in a suitable oven. It may be desirable to control the atmosphere in the oven with respect to pressure and/or the composition of the gases. Suitable ovens comprise, for example, an induction furnace or a tube furnace with gas flowing through the tube. The heat treatment can be performed following removal of the coated substrates from the coating chamber. In alternative embodiments, the heat treatment is integrated into the coating process such that the processing steps can be performed sequentially in the apparatus in an automated fashion.

For many applications, it is desirable to apply multiple particle coatings with different compositions. In general, these multiple particle coatings can be arranged adjacent to each other across the x-y plane of the substrate being coated (e.g., perpendicular to the direction of motion of the substrate relative to the product stream), or stacked one on top of the other across the z plane of the substrate being coated, or in any suitable combination of adjacent domains and stacked layers. Each coating can be applied to a desired thickness.

For optical applications in some embodiments, silicon oxide with different additive/dopant composition and/or concentration can be deposited adjacent each other and/or in alternating layers. Specifically, two layers with different compositions can be deposited with one on top of the other, and or additionally or alternatively, with one next to the other, such as layer A and layer B formed as AB. In other embodiments, more than two layers each with different compositions can be deposited, such as layer A, layer B and layer C deposited as three sequential (e.g., stacked one on top of the other, or adjacent to the other, or adjacent and stacked) layers ABC. Similarly, alternating sequences of layers with different compositions can be formed, such as ABABAB . . . or ABCABCABC . . . . Thus, by varying composition/optical properties along layers and/or between layers complex variation of optical properties can be accomplished along all three dimensions of an optical structure.

Individual layers, such as uniform layers, after consolidation generally have an average thickness in the range of less than 100 microns, in many embodiments in the range from about 1 micron to about 50 microns, in other embodiments in the range from about 3 microns to about 20 microns. A person of skill in the art will recognize that ranges within these specific ranges are contemplated and are within the scope of the present disclosure. Thickness is measured perpendicular to the projection plane in which the structure has a maximum surface area.

The material with multiple particle coatings can be heat treated after the deposition of each layer or following the deposition of multiple layers or some combination of the two approaches. The optimal processing order generally would depend on the melting point of the materials. Generally, however, it is desirable to heat treat and consolidate a plurality of layers simultaneously. Specifically, consolidating multiple layers simultaneously can reduce the time and complexity of the manufacturing process and, thus, reduce manufacturing costs. If the heating temperatures are picked at reasonable values, the melted materials remain sufficiently viscous that the layers do not merge undesirable amounts at the interface. Slight merging of the layers generally does not affect performance unacceptable amounts. By changing reaction conditions, particles can be deposited with changing particle size in the z-direction within a single layer or between layers. Thus, smaller particles can be deposited on top of larger particles. Since the smaller particles generally soften at lower temperatures, the consolidation of the upper layer can be less likely to damage the lower layers during the consolidation step. To form patterned structures following deposition, patterning approaches, such as lithography and photolithography, along with etching, such as chemical etching or radiation-based etching, can be used to form desired patterns in one or more layers. This patterning generally is performed on a structure prior to deposition of additional material. Patterning can be performed on particle layers or consolidated layers.

Integrated Gradient Index Lenses

Gradient index lenses can be incorporated into optical structures. Generally, the optical structures are integrated with other optical devices within the structure. The optical structures can be, for example, planar optical structures or optical fibers. The gradient index lenses can have an index-of-refraction that varies in one dimension or in two dimensions. By forming the gradient index lens directly into an integrated optical structure, the optical material forms a continuous material that does not have abrupt interfaces.

Figure 14:
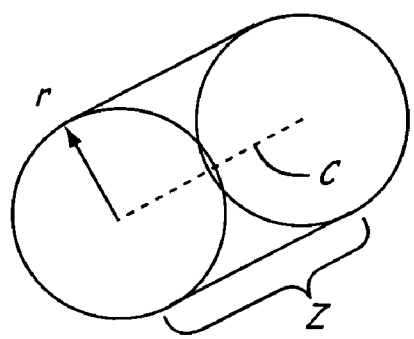
FIG. 14 is a perspective view of a gradient index lens with a radially varying index-of-refraction.
Figure 15:
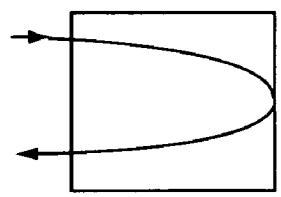
FIG. 15 is a schematic sectional side view indicating a trajectory corresponding to an object at infinity through a gradient index lens having a pitch value of 0.25.
Figure 16:
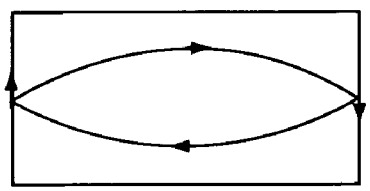
FIG. 16 is a schematic sectional side view indicating a trajectory corresponding to an object at the front surface of the lens through a gradient index lens having a pitch value of 0.5.
Figure 17:
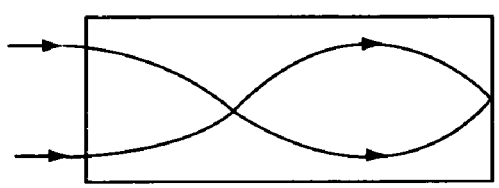
FIG. 17 is a schematic sectional side view indicating a trajectory corresponding to an object at infinity through a gradient index lens having a pitch value of 0.75.
Figure 18:
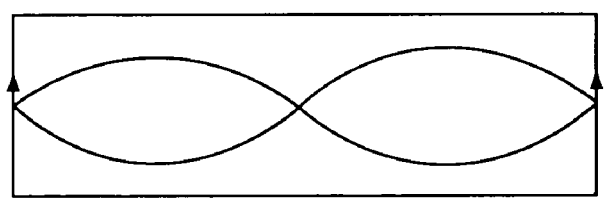
FIG. 18 is a schematic sectional side view indicating a trajectory corresponding to an object at the front surface of the lens through a gradient index lens having a pitch value of 1.0.

With respect to gradient index lenses with index gradients in two dimensions, the index-of-refraction varies with the radial distance from a central axis of the lens. The orientation of a gradient index lens with a radial variation in index-of-refraction is shown in FIG. 14. As shown in FIG. 14, the central axis is marked C and the radial direction is noted along a ray from the central axis. Light generally propagates through the lens with a component along the central axis.

While other functional dependences can be used, a quadratic drop in index-of-refraction with distance from the central axis results in a gradient index lens with optical properties of a conventional concave lens. For gradient index lenses with a variation in index-of-refraction approximating a quadratic function, the parabolic function describing the index-of-refraction distribution has a steepness that is described by the gradient constant, A. Although the gradient constant of an actual gradient index lens can be determined through indirect measurement techniques, the gradient constant characterizes a lens' optical performance. Specifically, the focusing properties for a particular wavelength of light depends on the value of the gradient constant. The dependence of the gradient constant on wavelength can be determined. The dispersion equation for a gradient index lens depends on the diameter and the numerical aperture of the lens.

Light passing through a gradient index lens is refracted due to the changing index-of-refraction. To evaluate the refraction, a particular light ray follows a sinusoidal path through an ideal gradient index lens. Light that has traversed one cycle of the sinusoidal wave that characterizes the lens is indicated to have traversed one pitch. The pitch (P) can be related to the mechanical length of the lens (Z) and the gradient constant according to the following equation: $2\pi P = \sqrt{A} \cdot Z$. The mechanical length Z is marked in FIG. 14 for the representative lens in the figure. FIGS. 15–19 illustrates particular light ray trajectories for gradient index lenses of various pitch values, P=0.25 object at infinity, P=0.5 object at front surface, P=0.75 object at infinity and P=1 object at front surface.

Figure 19:
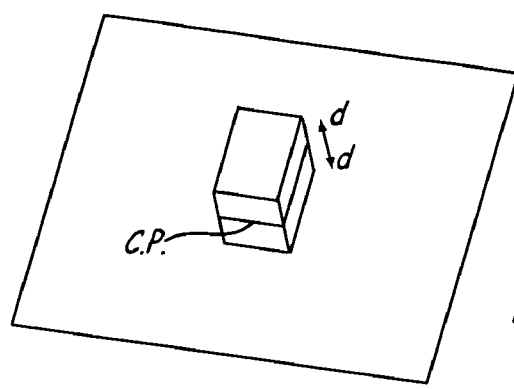
FIG. 19 is a schematic perspective view of a one-dimensional gradient index lens on a substrate surface with a central plane parallel to the substrate surface.
Figure 20:
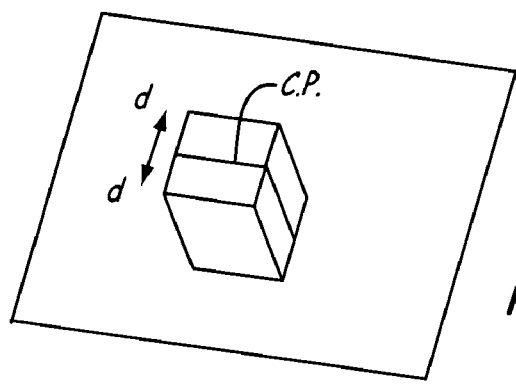
FIG. 20 is a schematic perspective view of a one-dimensional gradient index lens on a substrate surface with a central plane perpendicular to the substrate surface.

In contrast with conventional gradient index lenses, alternative embodiments of gradient index lenses have an indexof-refraction that varies in only one dimension. Thus, the index-of-refraction decreases relative to a central plane. Two alternative configurations for one-dimensional gradient index lenses on a planar surface are shown in FIGS. 19 and 20, with the central plane noted by C.P. and the distance d from the central plane is noted with rays.

While other function variation in index-of-refraction can be used, one-dimensional gradient index lenses that have an index-of-refraction that varies quadratically with distance from the central plane have optical properties analogous to conventional cylindrical lenses. Gradient index lenses with variation in index-of-refraction in one-dimension correspondingly bend light in only one dimension. Bending light in one dimension is suitable for integrating optical devices on a substrate surface. A one-dimension gradient index lens can counteract spread due to the numerical aperture at the surface of an optical device. Thus, these one-dimensional gradient index lenses are effective at coupling optical devices within an integrated optical circuit. The gradient index lens can be integrated with other optical devices during the formation of the optical circuit by forming the gradient index lens along with the other optical devices during the production process.

Ideal gradient index lenses provide smoothly varying light ray trajectories within the gradient index media. The paraxial or first-order behavior of gradient index materials can be modeled by assuming sinusoidal light ray paths within the lens. In alternative embodiments, the ideal variation in index-of-refraction can be approximated, for example, with a step-wise variation or other variation that is not precisely the quadratic variation. For these embodiments, light ray trajectories can be approximated with sinusoidal trajectories or simulation programs can be used based on a more realistic description of the index-of-refraction variation. In further embodiments, other functional dependence of the variation in index-of-refraction can be used rather than a quadratic dependence. For these embodiments, the trajectories of light rays can be simulated using appropriate simulation programs.

Figure 21:
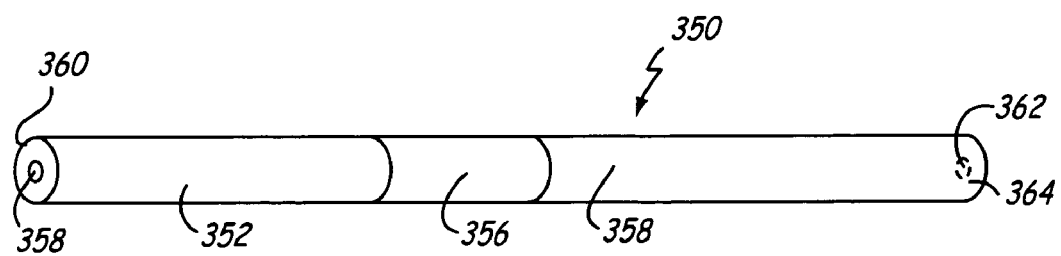
FIG. 21 is a schematic perspective view of a optical fiber with an integrated gradient index lens.

For the formation of integrated gradient index lenses, the gradient index lens generally is connected on either side or both sides with an optical device. The gradient index lens can be integrated within an optical circuit in either a fiber structure or a planar structure. An example of a fiber structure with en integrated gradient index lens is shown in FIG. 21. As shown in FIG. 21, optical. fiber element 350 comprises an optical amplifier 352, a gradient index lens 354 and a transmission fiber 356. Optical amplifier 352 generally comprises a core 358 surrounded by a cladding 360 in which the core comprises an amplifying optical material that absorbed energy to amplify a signal from an amplifying energy source optically coupled to the amplifying optical material. Transmission fiber 358 comprises a core 362 and cladding 364 with approximately constant index-of-refraction. Gradient index lens 354 connects optical amplifier 352 arid transmission fiber 356. Gradient index lens 354 can limit spreading and loss of light transmitted between optical amplifier 352 and transmission fiber 356. Gradient index lens 354 can be a one-dimensional or a two-dimensional gradient index lens.

As described below, planar optical structures and optical fiber preforms can be formed on a substrate. The substrate, for example, can be formed from silicon. Common substrates are round wafers, although substrates that are square or other shapes can be used. For the formation of preforms, it may be desirable to shape the substrate highly elongated in one dimension. The aspect ratio may range from about 1:5 to about 1:50, or in other embodiments from about 1:10 to about 1:25. A person of ordinary skill in the art will recognize that ranges and subranges within these explicit ranges are contemplated and are within the present disclosure. Similarly, for preforms it may be desirable to have coatings with dimensions that change as further coatings are added such that the final structure does not have a rectangular shape to facilitate pulling of the fiber from the preform. The formation of a gradient index lens in an optical fiber can be based on known geometric changes that occur upon the pulling of the fiber from the preform. The preform is softened by heating to form a viscous material that can be pulled to form the fiber. The formation of gradient index lenses in optical fibers is described further in U.S. Pat. No. 3,941,474, incorporated herein by reference.

In other embodiments, the gradient index lenses we integrated into planar optical structures. Generally, planar integrated optical structures are located on the suite or a planar substrate. However, substrateless planar structures are also contemplated. The formation of substrateless planar optical structures is described in copending and commonly assigned U.S. patent application Ser. No. 09/931,977 now U.S. Pat. No. 6,788,866 to Bryan et al., entitled "Layer Materials And Planar Optical Devices," incorporated herein by reference For substrateless embodiments, a projection of the planar device to obtain a maximum area provides a planar extent of the device. This projected planar extent establishes a plane analogous to the substrate suite for orienting a position along the planar surface.

For each set of core and cladding refractive indices, there is a narrow range of core diameters that will propagate the fundamental mode of a given wavelength with a low loss, but not allow any higher-order modes. The refractive-index difference also determines the range of angles at which incident light can continue to propagate down the guide. Therefore, the choice of wavelength and index-of-refraction difference determines the acceptance angle and optimum core size, as well as the spot size and divergence of the lowest-loss propagating beam. The different optical materials used for different components often differ in desirable spot-size and divergence angle, although the product of size times angle tends to be close to a constant. For example, some devices such as a single mode optical fiber have a larger desired spot size and a smaller divergence angle, whereas other optical devices, such as some gain blocks or small-bend-radius arrayed waveguide grating (AWG), have a smaller spot size and a larger divergence angle. If two optical devices with different optimal beam characteristics are simply butted together, an undesirable amount of light is lost at the interface, even if the materials are fused together or are codeposited.

Lenses can be used to convert one set of values for spot size and acceptance angle to one another with reduced loss. A gradient index lens integrated into an optical fiber or planar optical structure would function in the same way with all of the advantages of a gradient index lens over a conventional lens. By converting the output of one section of waveguide to a lower loss input parameters of the next section of an integrated system, no extra losses result that correspond to losses from a conventional lens that introduce extra surfaces.

In some applications, it is desirable to incorporate into an integrated structure both glass/amorphous materials and crystalline materials, single crystalline or polycrystalline. In particular, many waveguides, couplers, amplifiers and the like can be formed from silica-based glasses or other glass forming optical materials. It can be difficult to grow the crystals on a passive substrate. An alternative would be to place high quality crystalline sections of material into a glass structure. An advantage of using an integrated gradient index lens to connect a glass and crystalline material is that light transmitted through the crystalline material can be at least partly collimated with the lens prior to reaching the crystalline material. Most effects that occur in crystalline materials are angle sensitive. Collimated light can propagate at the same angle if the crystal is oriented to line up with the collimated beam. Any optical functions of the crystalline material can be more efficient with collimated light. Also, a similar gradient index lens receiving light from the crystalline material can reduce loss by collecting more light than a core end of a waveguide.

Similarly, other free space optical elements in general can be integrated into an optical structure, either a fiber based structure or a planar structure, by forming a cut out in the optical structure, for example, by etching. The free space optical element, such as a filter, grating, or the like, is then inserted into the cut out. The use of a gradient index lens is an alternative to using an external microlens to focus or collimate the light beam between the optical devices within the monolithic optical structure and the free space optical devices. The use of the gradient index lens results in the advantages discussed above and below.

Figure 22:
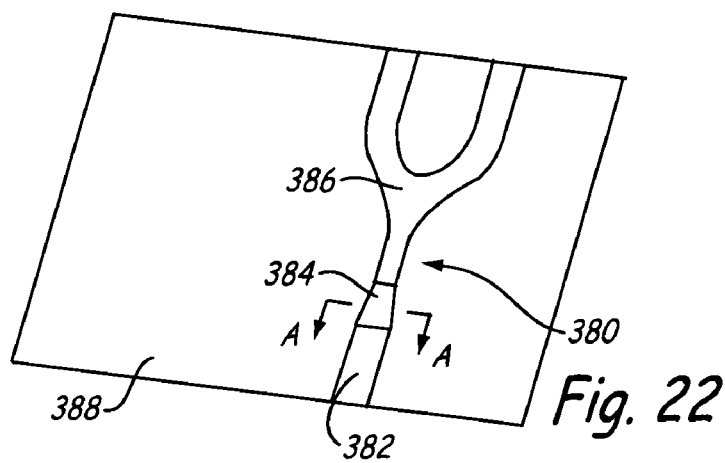
FIG. 22 is top view of a gradient index lens integrated into a planar optical circuit.

A representative example of a planar optical structure is shown in FIG. 22. As shown in FIG. 22, integrated optical circuit 380 includes a planar waveguide 382, a gradient index lens 384 and an optical coupler 386 on a substrate 388. Examples of one-dimensional gradient index lenses are shown in sectional views in FIGS. 23 and 24, and an example of a two-dimensional gradient index lens is shown in a sectional view in FIG. 25.

Figure 23:
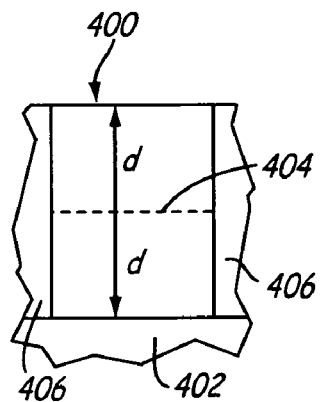
FIG. 23 is a fragmentary sectional view of one embodiment of a one-dimensional gradient index lens with a central plane parallel to the substrate surface, in which the cross section is taken along line A—A of FIG. 22.

Referring to FIG. 23, gradient index lens 400 is adjacent substrate 402. A central plane 404 is noted with phantom lines. The index of refraction varies along rays marked d. Cladding 406 with a lower index of refraction than the index at the central plane generally is located adjacent gradient index lens 400. Optionally, cladding can be included above and/or below gradient index lens 400.

Figure 24:
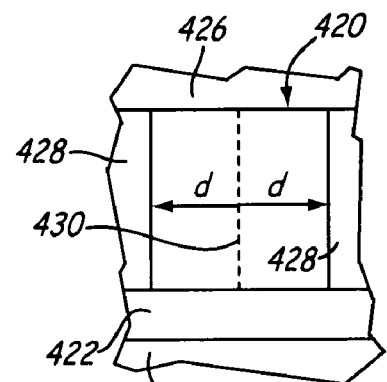
FIG. 24 is a fragmentary sectional view of another embodiment of a one-dimensional gradient index lens with a central plane perpendicular to the substrate surface, in which the cross section is taken along line A—A of FIG. 22.

Referring to FIG. 24, gradient index lens 420 is located on an under-cladding 422 which is adjacent a substrate 424. An over-cladding 426 can be placed on top of gradient index lens 402. Generally, cladding 428 is adjacent gradient index lens 420. Gradient index lens 420 has a one-dimensional variation in index-of-refraction with a central plane 430 noted in phantom lines. Cladding 428, under-cladding 422 and over-cladding 426 generally have an index-of-refraction lower than the index-of-refraction at central plane 430 of gradient index lens 402. Gradient index lens 420 has an orientation orthogonal to gradient index lens 400 in FIG. 23.

Figure 25:
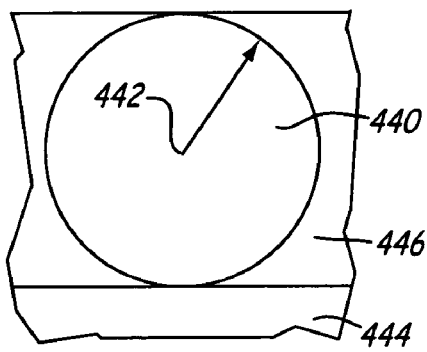
FIG. 25 is a fragmentary sectional view of another embodiment of a two-dimensional gradient index lens with a radial variation in index-of-refraction, in which the cross section is taken along line A—A of FIG. 22.

Referring to FIG. 25, gradient index lens 440 has a radially varying index-of-refraction. The index-of-refraction varies radially from central axis 442. Gradient index lens 440 is adjacent substrate 444 and is surrounded by cladding 446. An optional layer of over-cladding and/or under-cladding can be placed respectively over or under gradient index lens 440. The radial variation in index-of-refraction can be truncated with plans of cladding or the like without significantly altering performance of the lens.

It may be desirable to place two one-dimensional gradient index lenses with orthogonal variation in index-of-refraction adjacent each other along an integrated topical pathway, such as a fiber or a planar integrated structure. One of the one-dimensional gradient index lenses focuses light in a first dimension while the other lens can focus the light in the orthogonal dimension. Generally, the gradient index lenses can be placed in either order. The formation of two gradient index lenses may be easier to accomplish than the formation of a gradient index lens with radial variation in index of refraction while accomplishing a similar result. If desired, a waveguide can be placed between the two gradient index lenses.

Figure 26:
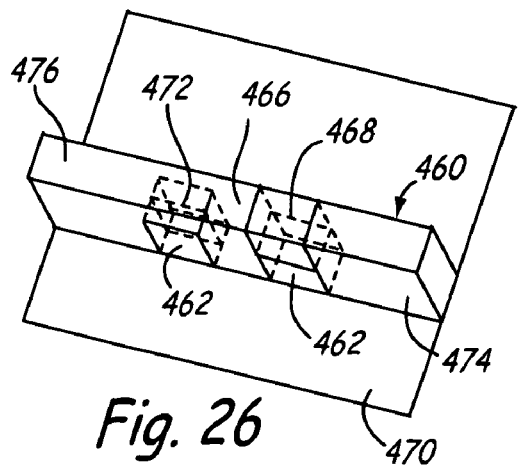
FIG. 26 is a schematic perspective view of a planar optical circuit with two integrated gradient index lenses.

Referring to FIG. 26, an integrated optical structure 460 comprises a first gradient index lens 462, a second integrated index lens 464 separated by an optional waveguide 466 with appropriate core and cladding. First gradient index lens 462 has a central plane 468 parallel to substrate surface 470, and second gradient index lens 464 has a central plane 472 perpendicular to substrate surface 470. Integrated optical structure 460 can comprise additional optical devices 474, 476, as desired.

Figure 27:
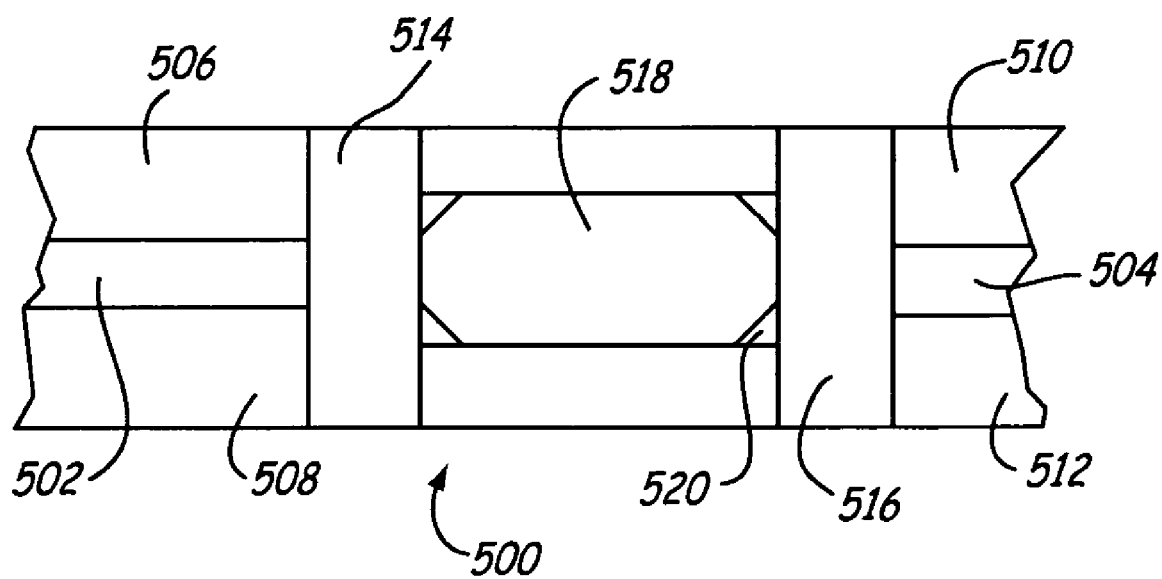
FIG. 27 is a schematic sectional view of an optical structure with a free space optical element optically connected to two integrated gradient index lenses.

An embodiment of an optical structure with gradient index lenses coupling optical elements of a monolithic optical structure with free space optics are shown in FIG. 27. Optical structure 500 includes a first waveguide core 502 and a second waveguide core 504 integrated within a monolithic structure. Cladding 506, 508 surround first waveguide core 502, and cladding 510, 512 surround second waveguide core 504. Gradient index lens 514 is optically coupled to first waveguide core 502, and second gradient index lens 516 is optically coupled to second waveguide core 504. Free space optical element 518 is located in cut out 520 between first gradient index lens 514 and second gradient index lens 516. Free space optical element 518 optically connects first gradient index lens 514 and second gradient index lens 516. Optical structure 500 can be a planar optical structure or a fiber-based optical waveguide structure. Only one or more than two gradient index lenses can be forming into the integrated optical structure. In addition, the optical structure can comprises other and/or additional optical devices. Similarly, cores 502, 504 can be replaced with active optical devices and/or other optical devices of interest.

Alignment sensitivity can be a major source of insertion loss in component coupling. Conventional single-mode waveguide/optical fiber cores are a few microns in diameter. For these cores, alignment within tens to hundreds of nanometers is used to obtain low-loss coupling. If the beams are collimated to a larger to a larger size than the core, position sensitivity is reduced. An integrated lens can be a convenient tool for performing the desired collimation.

In addition, the gradient index lenses can be incorporated as a component into more involved devices. For example, some planar optical devices, such as Echell gratings, incorporate a curved surface to focus light. These curved surfaces can be incorporated into an etch pattern. If a smooth surface is needed, the etching process can be very expensive because a smooth curve has a high resolution. Particularly if the curve is aspheric to minimize aberrations and produce tightly focused spots, the etching can be both difficult and expensive. A gradient index lens can produce the same effect as a curvature such that a properly placed gradient can enable the devices to function as if some surfaces were curved. However, the gradient index lenses can be produced with much simpler processing approaches, either etching along straight lines and/or formation of the gradient during the deposition process. Echelle gratings are described further in U.S. Pat. No. 6,339,662 to Koteles et al., entitled "Wavelength Stabilized Planar Waveguide Optical Devices Incorporating A Dispersive Element," incorporated herein by reference.

Similarly, delay lines can be used in planar optical devices to compensate for chromatic dispersion. In some embodiments, a delay line has a straight waveguide for the slowest traveling wavelength bands, and waveguides with bends to increase the path length for the faster traveling wavelength bands. The curved waveguides are more difficult to form by lithography or the like and take up more area on the substrate. Also, the curved waveguides can incur greater loss for a given error in index-of-refraction or sidewall roughness. Delay lines can be formed that are all straight using a gradient index lens. The delay lines involve changes in index-of-refraction that result different propagation times. The gradient index lens can be used to effectively couple the materials with the different indices-of-refraction.

Formation of Gradient Index Lenses

One-dimensional gradient index lenses and two-dimensional gradient index lenses can be formed by light reactive deposition in planar and optical fiber preform configurations. In some embodiments, the variation in index-of-refraction can be generated by variation in dopant concentrations. For example, a dopant that decreases index-of-refraction can be placed in gradually increasing amounts along the direction of decreasing index-of-refraction. Alternatively or additionally, a dopant that increases index-of-refraction can be placed in gradually decreasing amounts along a direction of decreasing index-of-refraction.

In some embodiments, dopants are introduced following formation of an optical structure by generating a porosity in the structure and contacting the structure with a compound comprising the dopant. In particular, powder array are inherently porous and can be contacted with appropriate dopant compositions prior to consolidation. However, the production of a composition gradient can involve careful control of the introduction of the dopant to the optical structure. Above, the use of light reactive deposition was described for the placement of desired compositions at selected locations within a three dimensional optical structure. This approach can be used to introduce an gradient in dopant levels particularly suitable for the formation of gradient index lenses. In particular, dopant levels can be changed gradually during the deposition process by appropriately changing the flow of dopant precursor in the reactant stream. A small gradual change in dopant precursors during the deposition process generally does not change the particle production process. With or without the use of masks, the desired compositions can be deposited by adjusting the composition and speed of moving the substrate through the product particle flow. The composition within the powder array can be selected such that the desired composition distribution is obtained following consolidation, i.e., densification.

As utilized herein, the term "in the range(s)" or "between" comprises the range defined by the values listed after the term "in the range(s)" or "between", as well as any and all subranges contained within such range, where each such subrange is defined as having as a first endpoint any value in such range, and as a second endpoint any value in such range that is greater than the first endpoint and that is in such range.

Light, e.g., ultraviolet or visible light, can also be used to alter the index-of-refraction. In particular, germanium containing glasses can undergo permanent changes in index-of-refraction as a result of illumination with light of appropriate wavelength and intensity. Specifically, germanium oxide and germanium doped silica are suitable optical materials. A pulsed excimer (KrF) laser produces suitable optical wavelength. The light can be focused to different positions within the optical material to vary the index-of-refraction as a function of depth within the optical material. The light can be similarly focused according to other geometries to introduce desired gradients in index-of-refraction. The variation in index-of-refraction of a material using light is described further in copending and commonly assigned PCT application designating the U.S. serial number PCT/US02/01702 to Bryan et al., entitled "Optical Materials With Selected Index Of Refraction," incorporated herein by reference.

The embodiments described above are intended to be illustrative and not limiting. Additional embodiments are within the claims below. Although the present invention has been described with reference to specific embodiments, workers skilled in the art will recognize that changes may be made in form and detail without departing from the spirit and scope of the invention. In addition, the terms including, comprising and having as used herein are intended to have broad non-limiting scope.

What we claim is:

1. A planar optical structure comprising a first planar optical waveguide and a first planar gradient index lens optically coupled to the planar optical waveguide, wherein the first planar gradient index lens has a gradient in index-of-refraction varying in one dimension perpendicular to a line along the propagation direction of the first waveguide and wherein the first planar waveguide and the first planar gradient index lens are part of a single monolithic structure.

2. The planar optical structure of claim 1 wherein the gradient in index-of-refraction varies approximating a quadratic function.

3. The planar optical structure of claim 1 wherein the gradient in index-of-refraction varies relative to a plane orthogonal to the surface of the planar optical structure.

4. The planar optical structure of claim 3 wherein the gradient is along an axis perpendicular to a plane orienting the structure.

5. The planar optical structure of claim 3 wherein the gradient is along an axis parallel to a plane orienting the structure.

6. The planar optical structure of claim 1 wherein the gradient comprises a step-wise gradient in index-of-refraction.

7. The planar optical structure of claim 1 wherein the gradient comprises a continuous change in index-of-refraction.

8. The planar optical structure of claim 1 further comprising a second planar waveguide and wherein the gradient index lens optically connects the first planar waveguide and the second planar waveguide along opposite sides of the gradient index lens.

9. The planar optical structure of claim 8 wherein the first planar waveguide comprises a core and the second planar waveguide comprises a core having a different thickness perpendicular to a plane orienting the structure relative to the thickness of the core of the first planar waveguide.

10. The planar optical structure of claim 8 wherein the first planar waveguide comprises a first core and the second planar waveguide comprises a second core having a width different from the width of the first core, wherein the width is along an axis parallel to a plane orienting the structure and approximately perpendicular to a light propagating direction through the first planar waveguide and the second planar waveguide.

11. The planar optical structure of claim 8 wherein the first planar waveguide comprises a first core and the second planar waveguide comprises a second core having a thickness and width each different from that of the first core, wherein the thickness is along an axis perpendicular to a plane orienting the structure relative to the thickness of the core of the first planar waveguide and wherein the width is along an axis parallel to a plane orienting the structure and approximately perpendicular to a light propagating direction through the first planar waveguide and the second planar waveguide.

12. The planar optical structure of claim 1 wherein the gradient index lens comprises glass.

13. The planar optical structure of claim 12 wherein the glass comprises silica glass.

14. The planar optical structure of claim 13 wherein the gradient in index-of-refraction corresponds with a gradient in composition of the silica glass.

15. An optical structure comprising a planar optical structure of claim 1 and an optical fiber connector optically connected to the gradient index lens.

16. The optical structure of claim 15 further comprising an optical fiber connected to the optical fiber connector.

17. The planar optical structure of claim 1 further comprising a second gradient index lens in optical communication with the first gradient index lens.

18. The planar optical structure of claim 17 wherein the second gradient index lens and the first gradient index lens are connected optically by a second planar waveguide.

19. The planar optical structure of claim 17 wherein the second gradient index lens and the first gradient index lens are in contact with each other.

20. The planar optical structure of claim 17 wherein the first gradient index lens has a gradient in index-of-refraction in first dimension oriented by a first axis and wherein the second gradient index lens has a gradient in index-of-refraction along a second dimension oriented by a second axis approximately perpendicular to the first axis.

21. The planar optical structure of claim 1 wherein the GRIN lens has a gradient in dopant concentration.

22. A method for forming a planar optical structure, the method comprising forming a monolithic structure comprising an optical layer having a core layer of a planar optical waveguide in optical communication with a planar gradient index lens having a gradient in index-of-refraction varying in one dimension perpendicular to a line along the propagation direction of the waveguide, wherein the planar gradient index lens is formed within the monolithic structure.

23. The method of claim 22 wherein a gradient in index-of-refraction is formed by a gradient in dopant concentrations.

24. The method of claim 22 wherein a gradient in index-of-refraction is formed by introducing dopants into a powder array.

25. The method of claim 22 wherein a gradient in index-of-refraction follow from a gradient in dopant concentrations formed during deposition.

26. The method of claim 22 wherein the gradient index lens comprises germanium and a gradient in index-of-refraction is formed using light.

27. A planar optical structure comprising a first planar optical waveguide, a second planar optical waveguide and a first planar gradient index lens optically coupled to the first planar optical waveguide wherein the gradient index lens optically connects the first planar waveguide and the second planar waveguide and wherein the first planar waveguide comprises a core and the second planar waveguide comprises a core having a different thickness perpendicular to a plane orienting the structure relative to the thickness of the core of the first planar waveguide.

28. The planar optical structure of claim 27 wherein the GRIN lens has a gradient in dopant concentration.

29. The planar optical structure of claim 27 wherein the gradient comprises a step-wise gradient in index-of-refraction.

30. The planar optical structure of claim 27 wherein the gradient comprises a continuous change in index-of-refraction.

31. A planar optical structure comprising a first planar optical waveguide and a first planar gradient index lens optically coupled to the planar optical waveguide wherein the first planar waveguide and the first planar gradient index lens are within a monolithic structure, wherein the gradient index lens has a gradient in dopant concentration, the gradient index tens having a gradient in index-of-refraction varying in one dimension perpendicular to a line along the propagation direction of the waveguide.

32. The planar optical structure of claim 31 wherein the gradient comprises a step-wise gradient in index-of-refraction.

33. The planar optical structure of claim 31 wherein the gradient comprises a continuous change in index-of-refraction.

34. The planar optical structure of claim 31 further comprising a second planar waveguide and wherein the gradient index lens optically connects the first planar waveguide and the second planar waveguide.

* * * * *